US011940839B2

(12) United States Patent
Cho

(10) Patent No.: US 11,940,839 B2
(45) Date of Patent: Mar. 26, 2024

(54) HINGE STRUCTURE INCLUDING COMPOUND GEAR AND FOLDABLE ELECTRONIC DEVICE INCLUDING THE SAME

(71) Applicant: Samsung Electronics Co., Ltd., Gyeonggi-do (KR)

(72) Inventor: Chongkun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 17/518,689

(22) Filed: Nov. 4, 2021

(65) Prior Publication Data

US 2022/0317730 A1 Oct. 6, 2022

Related U.S. Application Data

(63) Continuation of application No. PCT/KR2021/015091, filed on Oct. 26, 2021.

(30) Foreign Application Priority Data

Mar. 31, 2021 (KR) .......................... 10-2021-0041712

(51) Int. Cl.
*G06F 1/16* (2006.01)

(52) U.S. Cl.
CPC .......... *G06F 1/1641* (2013.01); *G06F 1/1681* (2013.01)

(58) Field of Classification Search
CPC ........ G06F 1/1641; G06F 1/1681; G06F 1/16; G06F 1/1652; E05D 3/122; E05Y 2201/71; E05Y 2900/606; F16C 11/04; H04M 1/0268; H04M 1/02; H04M 1/022; H04M 1/0216; H05K 5/0226

See application file for complete search history.

(56) References Cited

U.S. PATENT DOCUMENTS 9,115,750 B2 * 8/2015 Park ........................ F16C 11/10
9,915,086 B2 3/2018 Kato
(Continued)

FOREIGN PATENT DOCUMENTS

CN 211370996 U 8/2020
KR 10-1139866 B1 5/2012
(Continued)

OTHER PUBLICATIONS

International Search Report dated Feb. 28, 2022.

*Primary Examiner* — Sagar Shrestha
(74) *Attorney, Agent, or Firm* — Cha & Reiter, LLC

(57) ABSTRACT

Disclosed is a hinge structure that includes a first shaft, a second shaft, a first arm part, a second arm part, a first rotation part, a second rotation part, a first main gear, a second main gear, and first and second compound gears disposed between the main gears. The first compound gear may include a first gear portion geared with the first main gear, and of which a distance from a center point to a gear tooth end is a first radius, and a second gear portion geared with the second compound gear, and of which a distance from a center point to a gear tooth end is a second radius that is smaller than the first radius. The second compound gear may have a structure corresponding to that of the first compound gear. An electronic device including the hinge structure is also disclosed.

15 Claims, 20 Drawing Sheets

(56) References Cited

U.S. PATENT DOCUMENTS

| | | | |
|---|---|---|---|
| 10,303,223 B2 | 5/2019 | Park et al. | |
| 10,845,850 B1 | 11/2020 | Kang et al. | |
| 11,223,710 B2 | 1/2022 | Cheng | |
| 11,231,754 B2 | 1/2022 | Kang et al. | |
| 11,516,932 B2 | 11/2022 | Sim et al. | |
| 2012/0149438 A1 | 6/2012 | Kwon | |
| 2017/0328102 A1 | 11/2017 | Kato | |
| 2018/0024596 A1* | 1/2018 | Park | G06F 1/1681 |
| | | | 361/679.55 |
| 2020/0264673 A1 | 4/2020 | Kim et al. | |
| 2020/0348732 A1* | 11/2020 | Kang | G06F 1/1652 |
| 2020/0375046 A1 | 11/2020 | Sim et al. | |
| 2021/0011513 A1* | 1/2021 | Watamura | G06F 1/1652 |
| 2021/0067614 A1 | 3/2021 | Cheng | |
| 2021/0303032 A1 | 9/2021 | Hong et al. | |
| 2021/0303033 A1 | 9/2021 | Hong et al. | |
| 2021/0307186 A1 | 9/2021 | Hong et al. | |
| 2021/0325937 A1* | 10/2021 | Siddiqui | G06F 1/1679 |
| 2022/0011827 A1* | 1/2022 | Kim | F16C 11/04 |
| 2022/0113770 A1 | 4/2022 | Kang et al. | |
| 2022/0120124 A1* | 4/2022 | Quynh | F16C 11/04 |
| 2022/0210937 A1* | 6/2022 | Yun | G06F 1/1641 |
| 2023/0115172 A1 | 4/2023 | Lombardi et al. | |

FOREIGN PATENT DOCUMENTS

| | | |
|---|---|---|
| KR | 10-2017-0128149 A | 11/2017 |
| KR | 10-2019-0062107 A | 6/2019 |
| KR | 10-2020-0091740 A | 7/2020 |
| KR | 10-2020-0101241 A | 8/2020 |
| KR | 10-2020-0117773 A | 10/2020 |
| KR | 10-2020-0117777 A | 10/2020 |
| KR | 10-2020-0126524 A | 11/2020 |
| KR | 10-2020-0135636 A | 12/2020 |
| KR | 10-2311588 B1 | 10/2021 |
| KR | 10-2022-0027710 A | 3/2022 |
| KR | 10-2022-0093624 A | 7/2022 |
| WO | 2019/134696 A1 | 7/2019 |
| WO | 2021/194595 A1 | 9/2021 |

\* cited by examiner

HINGE STRUCTURE INCLUDING COMPOUND GEAR AND FOLDABLE ELECTRONIC DEVICE INCLUDING THE SAME

CROSS-REFERENCE TO RELATED APPLICATION(S)

This application is a continuation of International Application No. PCT/KR2021/015091, filed on Oct. 26, 2021, which claims priority to Korean Patent Application No. 10-2021-0041712 filed on Mar. 31, 2021 in the Korean Intellectual Property Office, the disclosures of which are herein incorporated by reference.

TECHNICAL FIELD

One or more embodiments of the instant disclosure generally relate to a hinge structure having a compound gear.

BACKGROUND ART

A portable electronic device, such as a smartphone, may provide various functions, such as voice communication, playback of videos, and online internet searches, using various kinds of applications. For many of the provided functions, such as video playback, a larger screen is preferred. However, having larger screens negatively impact the portability of the devices. Accordingly, a foldable portable electronic device that may increase portability by utilizing a folded structure and a foldable screen has been developed.

The foldable electronic device includes housings, the housings are connected to each other through a hinge structure that is adjacent to the housings, and the hinge structure supports the housings while the housings are rotated at various angles.

DISCLOSURE

Technical Problem

The foldable electronic device can include a gear structure used for sharing the external pressure applied in relation to the folding or unfolding of the device. The gear structure requires a specific thickness, and accordingly, it is difficult to reduce the thickness of the foldable electronic device with the gear structure implemented therein.

Technical Solution

Certain embodiments of the disclosure provide a hinge structure having a compound gear that achieves slimness for the foldable electronic device, and a foldable electronic device including the same. The slimness may be achieved by forming gears of the gear structure in a compound structure.

Furthermore, certain embodiments provide a hinge structure having a compound structure that may reduce damage to the display due to impact by sufficiently providing a specific space between the display and a gear structure as the display is folded, and a foldable electronic device including the same.

Other various objectives will be described through embodiments, which will be described below.

According to an embodiment, an electronic device (or a portable electronic device, a portable communication device, a foldable electronic device, or a foldable electronic device having a communication function) may include a first housing and a second housing, a hinge structure connected to the first housing and the second housing, and a display disposed in the first housing and/or the second housing, the hinge structure may include a first shaft rotating about a first axis, a second shaft rotating about a second axis, a first arm part connected to the first shaft, a second arm part connected to the second shaft, a first rotation part connected to the first arm part and rotating about a third axis, a second rotation part connected to the second arm part and rotating about a fourth axis, a first main gear disposed on the first shaft, a second main gear disposed on the second shaft, and a first compound gear and a second compound gear disposed between the first main gear and the second main gear, the first compound gear may include a first gear portion geared with the first main gear, and of which a distance from a center point to a gear tooth end is a first radius, and a second gear portion geared with the second compound gear, and of which a distance from a center point to a gear tooth end is a second radius that is smaller than the first radius, and the second compound gear may include a third gear portion geared with the second main gear, and of which a distance from a center point to a gear tooth end is a first radius, and a fourth gear portion geared with the second gear portion of the first compound gear, and of which a distance from a center point to a gear tooth end is the second radius.

According to an embodiment, a hinge structure included in the foldable electronic device may include a first shaft rotating about a first axis, a second shaft rotating about a second axis, a first arm part connected to the first shaft, a second arm part connected to the second shaft, a first rotation part connected to the first arm part and rotating about a third axis, a second rotation part connected to the second arm part and rotating about a fourth axis, a first main gear disposed on the first shaft, a second main gear disposed on the second shaft, and a first compound gear and a second compound gear disposed between the first main gear and the second main gear, the first compound gear may include a first gear portion geared with the first main gear, and of which a distance from a center point to a gear tooth end is a first radius, and a second gear portion geared with the second compound gear, and of which a distance from a center point to a gear tooth end is a second radius that is smaller than the first radius, and the second compound gear may include a third gear portion geared with the second main gear, and of which a distance from a center point to a gear tooth end is a first radius, and a fourth gear portion geared with the second gear portion of the first compound gear, and of which a distance from a center point to a gear tooth end is the second radius.

Advantageous Effects

The hinge structure having a compound gear and the foldable electronic device including the same according to certain embodiments may provide a foldable electronic device having a slimmer shape.

Furthermore, the hinge structure and the foldable electronic device including the same according to the embodiments may reduce damage to the display due to external pressure.

Other various purposes and effects provided by the hinge structure and the foldable electronic device including the same according to certain embodiments may be shown according to the embodiments of the detailed description.

MODE FOR INVENTION

Figure 1A:
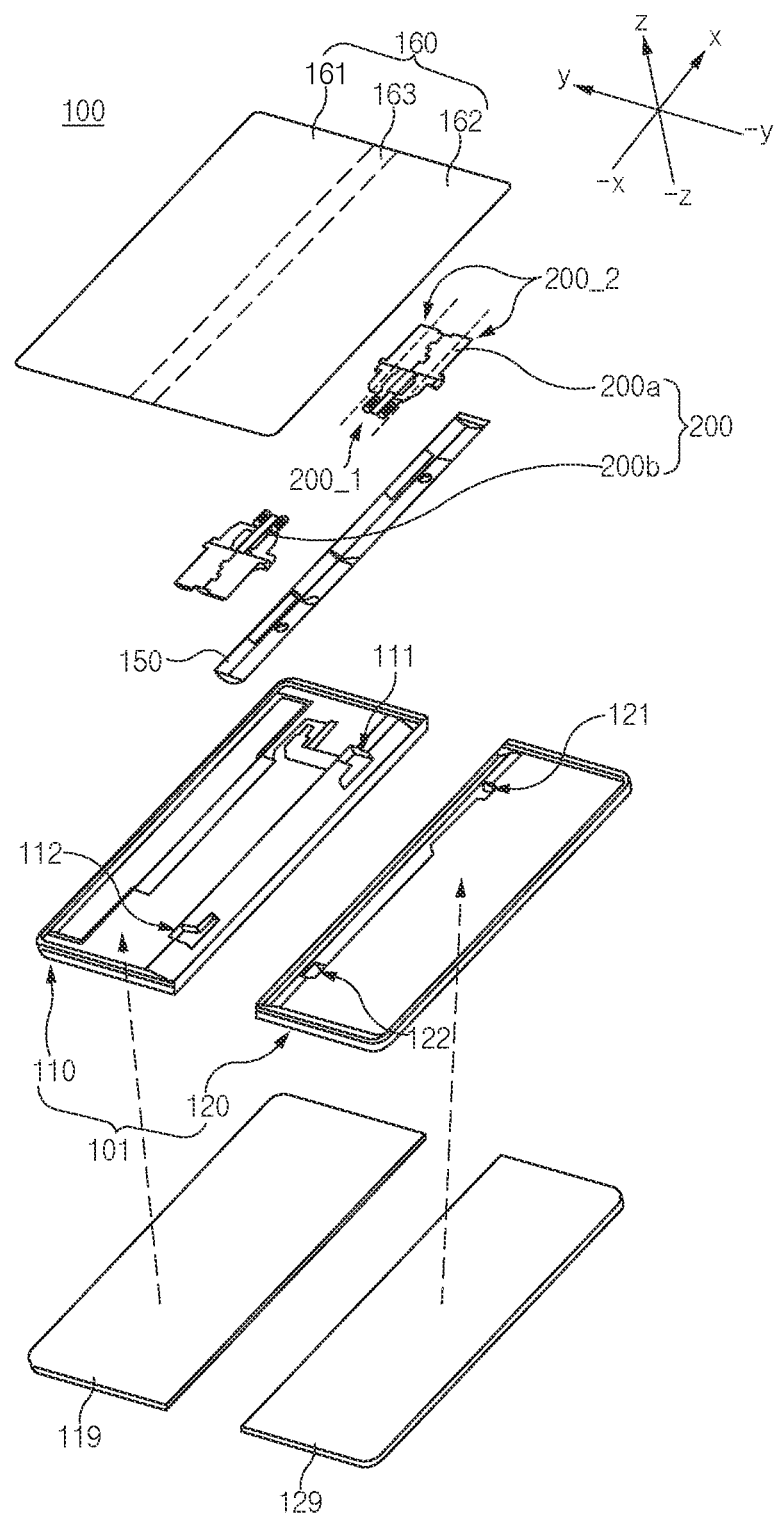
FIG. 1A is a view illustrating an exploded perspective view of an electronic device according to an embodiment.

Hereinafter, various embodiments of the disclosure will be described with reference to the accompanying drawings. Accordingly, those of ordinary skill in the art will recognize that modification, equivalent, and/or alternative on the various embodiments described herein can be variously made without departing from the scope and spirit of the disclosure. With regard to the description of drawings, similar components may be denoted by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. According to occasions, even a term defined in the disclosure cannot be construed to exclude the embodiments of the disclosure.

An electronic device according to various embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the disclosure, the wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), or implantable types (e.g., implantable circuits).

Hereinafter, electronic devices according to an embodiment of the disclosure will be described with reference to the accompanying drawings. The term "user" used herein may refer to a person who uses an electronic device or may refer to a device (e.g., an artificial electronic device) that uses an electronic device.

Figure 1B:
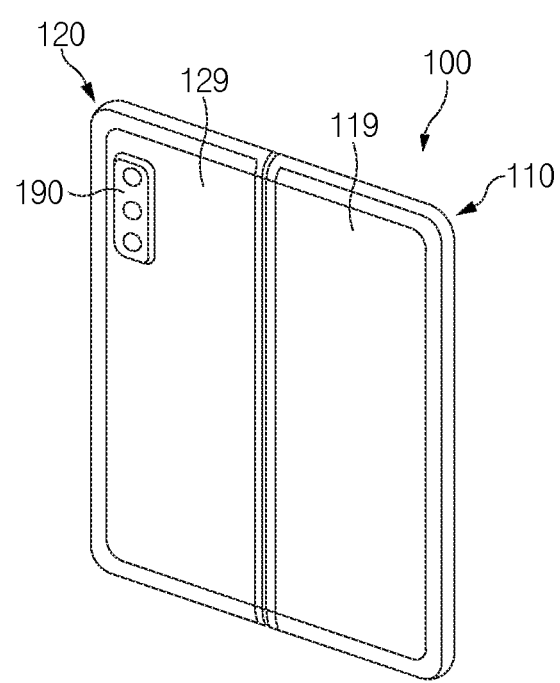
FIG. 1B is a view illustrating an example of a rear surface of an electronic device according to an embodiment.
Figure 1C:
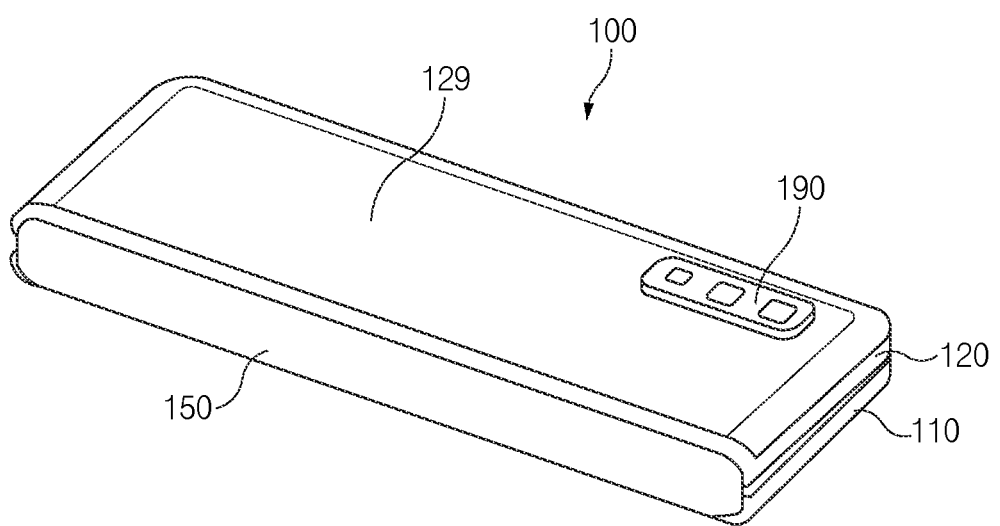
FIG. 1C is a view illustrating an example of a folded state of an electronic device according to an embodiment.

FIG. 1A is a view illustrating an exploded perspective view of an electronic device according to an embodiment. FIG. 1B is a view illustrating an example of a rear surface of an electronic device according to an embodiment. FIG. 1C is a view illustrating an example of a folded state of an electronic device according to an embodiment.

Referring to FIGS. 1A to 1C, an electronic device 100 (or a foldable electronic device, a flexible display, or a flexible & foldable electronic device) according to an embodiment, includes a housing (or a case, a bracket, or a frame) 101 (e.g., a first housing 110 and a second housing 120), a hinge housing 150, a hinge structure 200 (e.g., a first hinge structure 200a and a second hinge structure 200b), and a display 160 (or a flexible display or a display module), at least a portion of which is disposed on a forward direction (e.g., the z axis direction) of the hinge structure 200. Additionally or alternatively, the electronic device 100 may further include a first cover 119 that covers at least a portion of a rear surface (e.g., a surface that faces the −z axis direction) of the first housing (or a first housing part or a first housing portion) 110, and a second cover 129 that covers at least a portion of a rear surface (e.g., a surface that faces the −z axis direction) of the second housing (or a second housing part or a second housing portion) 120. Furthermore, the first cover 119 may integrally form a rear surface of the first housing 110, and the second cover 129 may integrally form a rear surface of the second housing 120.

The housing 101 may be at least a pair of housings that may be rotated about a specific axis. For example, the housing 101 may include the first housing 110 and the second housing 120. The first housing 110 may be disposed to be continuous to the second housing 120 (e.g., when a central portion 163 of the display 160 is spread flat or the housing 101 is in an unfolded state), or may be disposed in parallel to the second housing 120 depending on how the electronic device is folded. Furthermore, when the central portion 163 of the display 160 is folded, one surface of the first housing 110 may be disposed to face one surface of the second housing 120.

The first housing 110, for example, may be configured such that at least a portion thereof is made of a metallic material or at least a portion thereof is made of a nonmetallic material. For example, the first housing 110 may be made of a material having a specific strength to support at least a portion of the display 160. An area (e.g., at least a portion of a first part 161 of the display 160 and at least a portion of one side of the central portion 163) of the display 160 may be disposed at at least a portion of the front surface of the first housing 110. Furthermore, at least a portion of the first housing 110 may be bonded to the first part 161 of the display 160. For example, at least a portion of an edge of the front surface of the first housing 110 may be bonded to an edge of the first part 161 of the display 160. Furthermore, at least a portion of the front surface (e.g., a surface in the z axis direction) of the first housing 110 may be bonded to at least a portion of the first part 161 of the display 160. In this regard, a bonding layer may be disposed at at least a portion between the first housing 110 and the first part 161 of the display 160. At least a portion of the inside of the first housing 110 may be provided such that the interior thereof is empty or may be provided such that the interior thereof is empty after the first housing 110 is coupled to the first cover 119 so that an electronic element (e.g., an element, such as a printed circuit board, at least one processor mounted on the printed circuit board, at least one memory, or a battery) that is necessary for driving the electronic device 100 may be disposed.

According to an embodiment, edge ends (edge ends of the three sides other than the edge that faces the second housing 120 in the unfolded state of the electronic device 100) of the first housing 110 may protrude by a specific height further than a bottom surface of a central part of the housing to surround an edge of at least one side of the display 160. Furthermore, side walls, at least portions of which face an edge of the display 160, may be disposed at at least a portion of the edge end of the first housing 110. Side walls formed at at least a portion of an edge of the first housing 110 may have specific heights at the three edges other than the edge that faces the second housing 120. The edge portion of the first housing 110 that faces the second housing 120 may include a recessed part, at least a portion of which has a specific curvature such that at least a portion of the hinge housing 150 is disposed. For example, the first housing 110 may include a first stepped portion 111, at which a portion of the first hinge structure 200a located in the hinge housing 150 is located, at an edge portion that faces the second housing 120, and a second stepped portion 112, at which a portion of the second hinge structure 200b located in the hinge housing 150 is disposed.

According to an embodiment, the second housing 120, may be disposed in parallel to the first housing 110 or may be disposed such that at least one surface thereof faces one surface (e.g., a surface on which the display 160 is disposed) of the first housing 110 in the various states of the electronic device. For example, the second housing 120 may be made of the same material as the first housing 110. Because the second housing 120 is disposed to be symmetrical to the first housing 110 in several directions, such as leftwards, rightwards, upwards, and downwards, at least a portion (e.g., at least a portion of the second part 162 of the display 160 and at least a portion of an opposite side of the central part 163) of the remaining area of the display 160 other than the area disposed in the first housing 110, may be disposed to be supported by a front surface of the second housing 120. Furthermore, at least a portion of the second housing 120 may be bonded to the second part 162 of the display 160. For example, an edge of the front surface of the first housing 110 may be bonded to an edge of the second part 162 of the display 160. Furthermore, one side of a lower portion of the front surface of the second housing 120 may be bonded to one side of the second part 162 of the display 160. In this regard, a bonding layer may be disposed at at least a portion between the second housing 120 and the second part 162 of the display 160. At least a portion of the inside of the second housing 120 may be configured such that the interior thereof is empty similarly to the first housing 110 or may be configured such that the interior thereof is empty after the second housing 120 is coupled to the second cover 129 so that electronic elements that are necessary for driving the electronic device 100 may be disposed. According to an embodiment, a camera 190 may be disposed on the rear surface of the second housing 120, and in relation to disposition of the camera 190, a hole, in which the camera 190 may be disposed, may be formed in the second cover 129.

According to an embodiment, edge ends (e.g., edge ends of the three sides other than the edge that faces the first housing 110) of the second housing 120 may protrude by a specific height further than a bottom surface of a central part of the second housing 120 to surround the corresponding edges of the display 160. Furthermore, similarly to the side walls formed in the first housing 110, side walls, at least portions of which face the edge of the display 160, may be disposed at at least a portion of the edge end of the second housing 120. Side walls formed at at least a portion of an edge of the second housing 120 may have specific heights at the three edges other than the edge that faces the first housing 110.

According to an embodiment, a portion of the second housing 120, which faces the first housing 110, may include a recessed part, at least a portion of which has a specific curvature such that the hinge housing 150 is disposed. For example, the second housing 120 may include a third stepped portion 121, at which a portion of the hinge housing 150, to which the first hinge structure 200*a* is mounted, is disposed at an edge portion that faces the first housing 110, and a fourth stepped portion 122, at which a portion of the hinge housing 150, on which the second hinge structure 200*b* is mounted, is disposed.

According to an embodiment, the electronic device 100 may include at least one sensor disposed on one side of an interior of the first housing 110 or the second housing 120. The sensor, for example, may include at least one of a proximity sensor, an illumination sensor, an iris sensor, an image sensor (or a camera), or a fingerprint sensor.

According to an embodiment, the hinge housing 150 may be covered by one side of the first housing 110 or the second housing 120 (e.g., in an unfolded state of the housing 101) or be exposed to the outside (e.g., in a folded state of the housing 101) according to (or in correspondence to or during) the folded or unfolded state of the foldable electronic device 100. For example, when the first housing 110 and the second housing 120 are disposed parallel to each other, the hinge housing 150 may be covered by the first housing 110 and the second housing 120. When one surface of the first housing 110 and one surface of the second housing 120 are disposed to face each other, the hinge housing 150 may be disposed such that at least a portion thereof is exposed to the outside at edges (e.g., edges of the first housing 110 and the second housing 120, which face each other in the unfolded state) of one side of the first housing 110 and the second housing 120. A side wall may be disposed in the hinge housing 150 such that at least a portion of an interior thereof is empty and at least portions of opposite edges (e.g., edges in the x axis and −x axis directions) are closed. At least one boss coupled to the first hinge structure 200*a* and the second hinge structure 200*b* may be disposed at at least a portion of the inner surface of the hinge housing 150.

According to an embodiment, at least a portion of the display 160 may be flexible. According to an embodiment, the display 160 may include the first part 161 or the first area disposed on the first housing 110, the second part 162 or the second area disposed on the second housing 120, and the central part 163 or a central area that are adjacent to the first housing 110 and the second housing 120 and corresponds to the location of the hinge structure 200 when the electronic device 100 is in the unfolded state. According to another embodiment, the entire display 160 may be flexible. Furthermore, at least a portion of the central part 163 of the display 160 may be flexible. The central part 163 of the display 160 may be disposed not to be bonded to the first housing 110 and the second housing 120. For example, the central part 163 of the display 160 may be spaced apart from the front surface (e.g., a surface in the z axis direction) of the hinge structure 200 during the folding operation of the electronic device 100. The first part 161 of the display 160 may be bonded to at least a portion of the first housing 110, and the second part 162 of the display 160 may be bonded to at least a portion of the second housing 120. In this regard, bonding layers may be disposed in at least a partial area between the display 160 and the first housing 110 and in at least a partial area between the display 160 and the second housing 120. The display 160 may include various layers. For example, the display 160 may include an external protection layer (or a glass layer or a polymer layer) of a specific size having a specific transparency, a display panel layer disposed under the external protection layer for displaying content, and a first rear surface layer disposed under the display panel layer. The rear surface layer may include an impact absorbing layer (or an embossing layer) and a heat dissipating layer (or a metal sheet layer). Additionally or alternatively, the first rear surface layer may further include an electromagnetic induction panel (e.g., a digitizer). According to an embodiment, the display 160 may further include a second rear surface layer disposed under the first rear surface layer. At least a portion of the second rear surface layer may include at least one metal layer (or a metal sheet). The second rear surface layer may include a specific pattern (e.g., a lattice pattern or a slit pattern) such that at least a portion thereof may be bent. Furthermore, at least a portion of the second rear surface may be made of another material (e.g., polymer, rubber, or leather) that may be bent.

According to an embodiment, at least one hinge structure 200 may be disposed with respect to the x axis direction. For example, the hinge structure 200 may include a first hinge structure 200*a* and a second hinge structure 200*b*. The hinge structure 200 may include a first part 200_1 disposed on an inside of the hinge housing 150, and a second part 200_2 disposed on the hinge housing 150 or corresponding to a peripheral structure (e.g., a structure coupled to the first housing 110 and the second housing 120) that does not overlap the hinge housing 150 with respect to the z axis. At least a portion of the first hinge structure 200*a* of the first part of the hinge structure 200 may be disposed on a first inner side (e.g., an area biased to the x axis direction in the hinge housing 150) of the hinge housing 150. At least a portion of the second hinge structure 200*b* of the first part of the hinge structure 200 may be disposed on a second inner side (e.g., an area biased to the −x axis direction in the hinge housing 150) of the hinge housing 150. At least a portion of the second part 200_2 of the hinge structure 200 may be rotated in correspondence to rotation of the first housing 110 and the second housing 120. At least one of the first hinge structure 200*a* and the second hinge structure 200*b* according to an embodiment may employ a structure including a compound gear.

Figure 2:
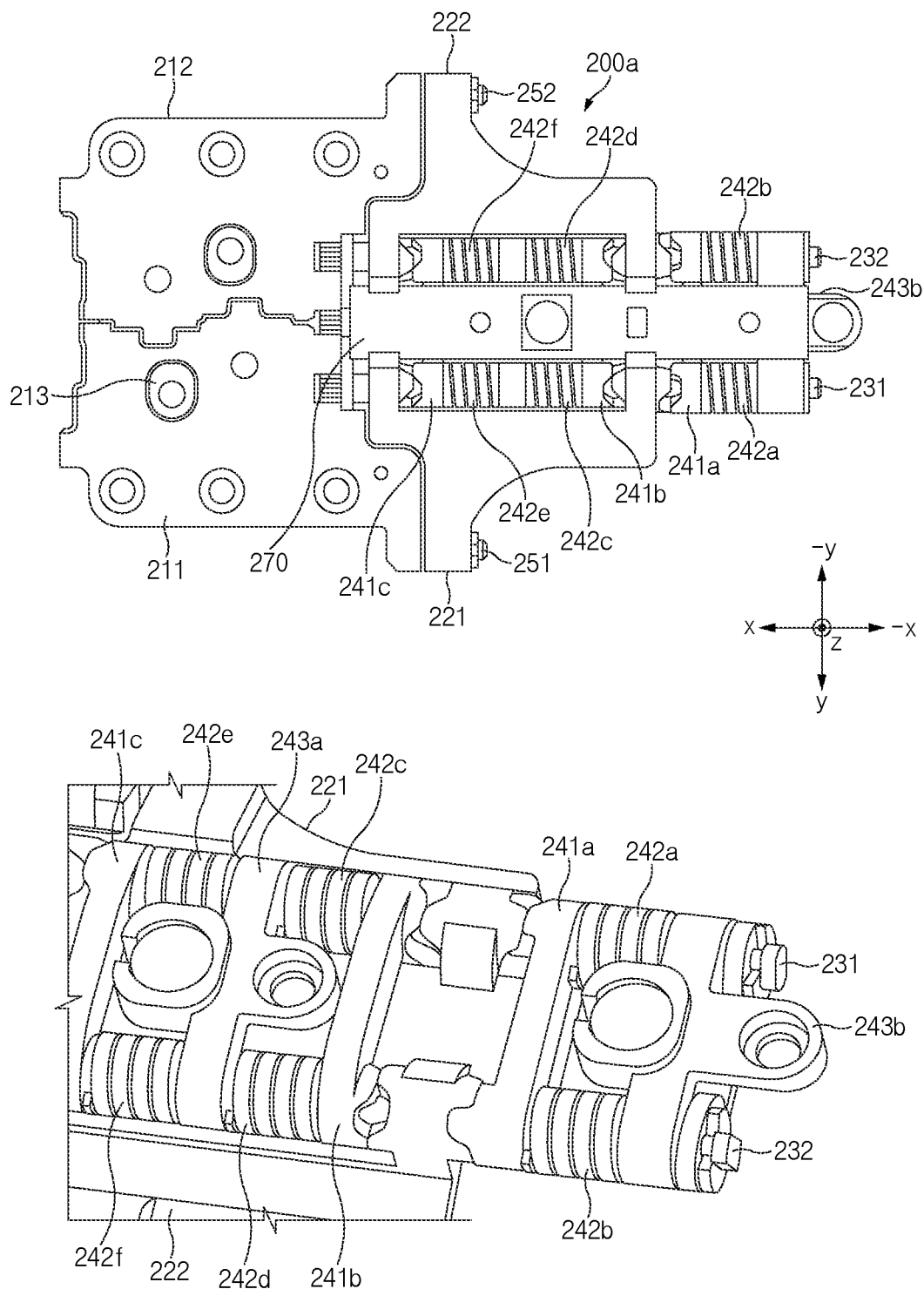
FIG. 2 is a view illustrating an example of a front surface and a rear surface of a hinge structure having a center bar according to an embodiment.
Figure 3:
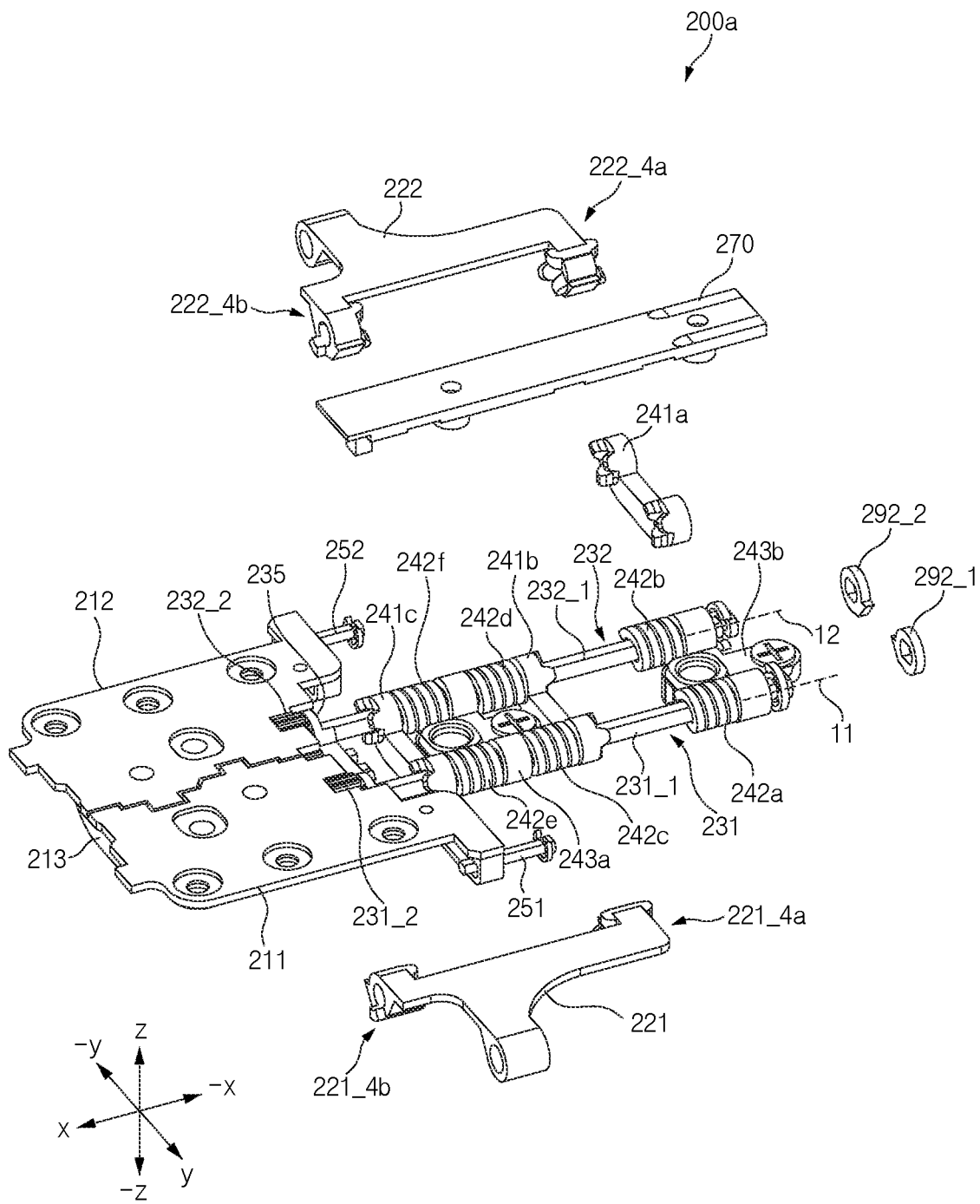
FIG. 3 is a view illustrating a surface of a hinge structure, in a first direction of an exploded view according to an embodiment.
Figure 4:
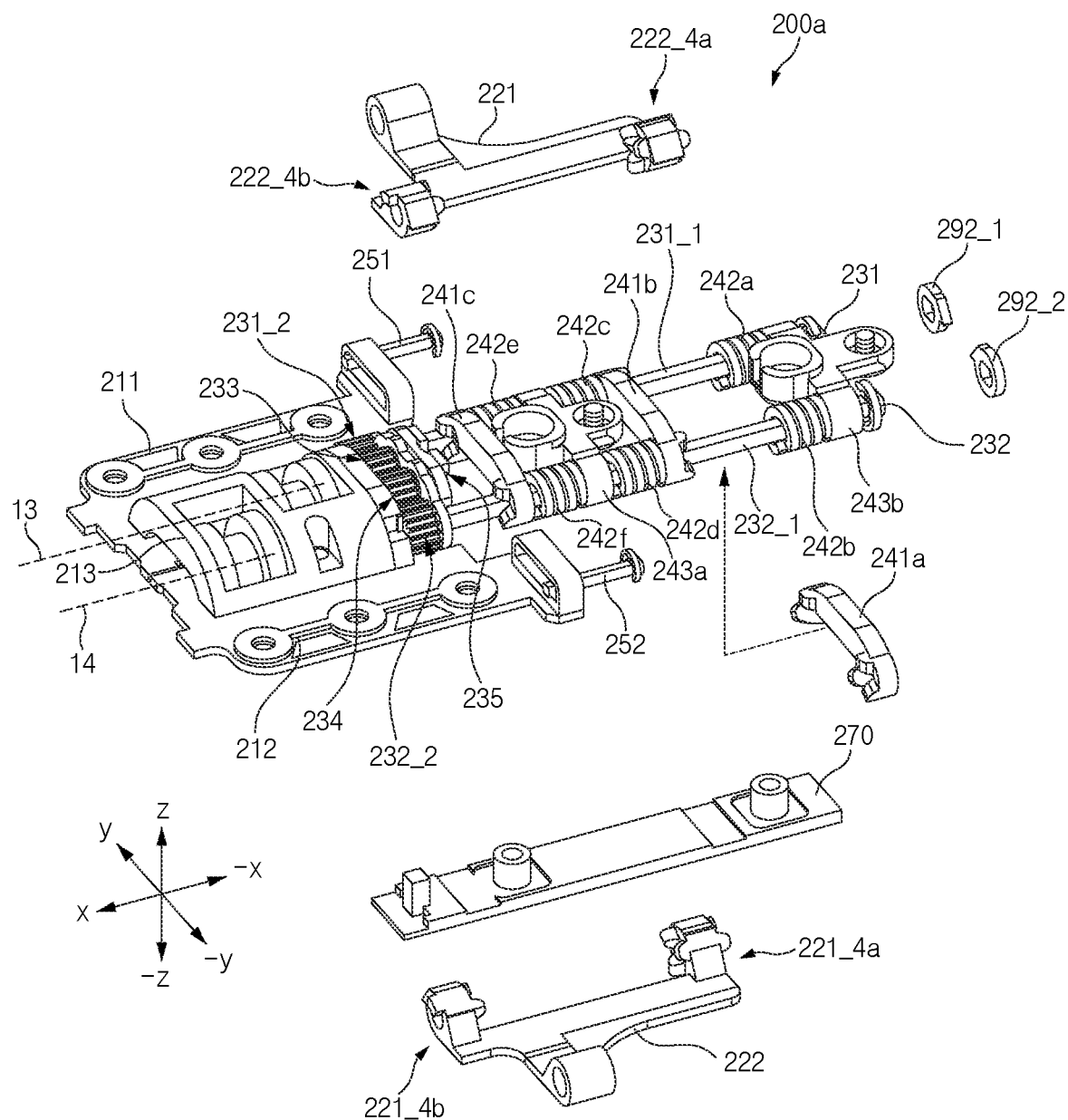
FIG. 4 is a view illustrating a surface of a hinge structure, in a second direction of an exploded view according to an embodiment.

FIG. 2 is a view illustrating an example of a front surface and a rear surface of a hinge structure having a center bar according to an embodiment. FIG. 3 is a view illustrating a surface of a hinge structure, in a first direction of an exploded view according to an embodiment. FIG. 4 is a view illustrating a surface of a hinge structure, in a second direction of an exploded view according to an embodiment.

Referring to FIGS. 1 to 4, an electronic device 100 according to an embodiment may include a plurality of hinge structures 200, and the first hinge structure 200a and the second hinge structure 200b may have the same structure and shape. In the following description, the first hinge structure 200a will be referenced. Although FIG. 1 suggests a structure, in which the first hinge structure 200a and the second hinge structure 200b are disposed in the hinge housing 150, the disclosure is not limited thereto, and three or more hinge structures may be mounted on the hinge housing 150.

According to an embodiment, the first hinge structure 200a may include rotation parts 211 and 212, a fixing bracket 213, arm parts 221 (or arm units) and 222, compound gears 233 and 234, a detent structure (e.g., a plurality of elastic bodies 242a, 242b, 242c, 242d, 242e, and 242f and cam related configurations), and a center bar 270.

According to an embodiment, the rotation parts 211 and 212 may be connected to the housings 110 and 120 that support at least a portion of the display 160 in relation to a closing or folding operation of the display 160. The rotation parts 211 and 212 may include a first rotation part 211 coupled to one side of the fixing bracket 213 and a second rotation part 212 coupled to an opposite side of the fixing bracket 213. The first rotation part 211 may be rotated (e.g., a clockwise direction or a counterclockwise direction with respect to the x axis) in a first angle range while being coupled to one side of the fixing bracket 213. The second rotation part 212 may be rotated (e.g., a counterclockwise direction or a clockwise direction with respect to the x axis) in a second angle range while being coupled to one side of the fixing bracket 213. Sizes of the first angle range and the second angle range may be the same, and directions thereof may be opposite to each other. When the electronic device 100 is in the unfolded state, an edge of the first rotation part 211 in the −y axis direction may be disposed to be adjacent to an edge of the second rotation part 212 in the y axis direction. When the foldable electronic device 100 is in the folded state, an upper surface (e.g., a surface that faces the z axis direction) of the first rotation part 211 and an upper surface (e.g., a surface that face the z axis direction) of the second rotation part 212 may be disposed to face each other.

According to an embodiment, the first rotation part 211 may be rotated within a specific angle range (e.g., 0 to 100 degrees or 0 to 95 degrees) about an imaginary axis that is different from the first rotary shaft 231. According to an embodiment, the first second part 212 may be rotated within a specific angle range (e.g., 0 to −100 degrees or 0 to −95 degrees) about an imaginary axis that is different from the second rotary shaft 232. An imaginary axis related to the first rotation part 211 and an imaginary axis related to the second rotation part 212 may be located to be spaced apart from each other by a specific interval (e.g., may have a spacing distance that is larger than a distance between a center of the first rotary shaft 231 and a center of the second rotary shaft 232), may be located on the xy plane, and may be located above the center of the first rotary shaft 231 and the second rotary shaft 232 with respect to the z axis.

According to an embodiment, at least a portion of the fixing bracket 213 may be disposed in and fixed to an inner empty space of the hinge housing 150. In this regard, at least a portion of the fixing bracket may have a size corresponding to the inner empty space of the hinge housing 150. Furthermore, at least a portion of the fixing bracket may have a shape corresponding to the inner empty space of the hinge housing 150, for example, a semi-cylindrical shape. The fixing bracket 213 may include at least one hole, into which at least one boss formed in the hinge housing 150 may be inserted. One side of the first rotation part 211 may be disposed on one side of the fixing bracket 213 to be rotatable within a specific angle range, and one side of the second rotation part 212 may be disposed on an opposite side of the fixing bracket 213 to be rotatable within a specific angle range. One side of the first rotary shaft 231, one side of the second rotary shaft 232, and portions of the compound gears 233 and 234 may be disposed on and fixed to one side (an end in the −x axis direction) of the fixing bracket 213.

According to an embodiment, the arm parts (or arm structures, or arm units) 221 and 222 may be rotated about the centers of the rotary shafts (e.g., the first rotary shaft 231 and the second rotary shaft 232) (e.g., may be rotated about a first axis 11 corresponding to the center of the first rotary shaft 231 and a second axis 12 corresponding to the center of the second rotary shaft 232), and may implement a detent operation while being engaged with the cam members 241a, 241b, and 241c. For example, sides of the rotation parts 211 and 212 are connected to the arm parts 221 and 222 through coupling parts 251 and 252, and according to (or in correspondence to or during) rotation of the rotation parts 211 and 212, the arm parts 221 and 222 may be slid along at least portions of sides of the rotation parts 211 and 212. The arm parts 221 and 222, for example, may include a first arm part 221 connected to the first rotation part 211 through a first coupling part 251, and a second arm part 222 connected to the second rotation part 212 through a second coupling part 252. The first arm part 221 may include a plurality of cam structures coupled to the cam members 241a, 241b, and 241c, and the second arm part 222 may include a plurality of cam structures coupled to the cam members 241a, 241b, and 241c included in the multi-detent structure 240.

According to an embodiment, the first rotary shaft 231 and the second rotary shaft 232 may provide a cam type hinge force (or a feeling of a detent). The first rotary shaft 231 and the second rotary shaft 232 may have lengths that are longer than a spacing distance between the cam structures formed in the arm parts 221 and 222. The first rotary shaft 231 and the second rotary shaft 232 may be disposed to be spaced apart from each other, and may be disposed in parallel in the x axis direction. Main gears (or shaft gears) 231_2 and 232_2 may be formed in the first rotary shaft 231 and the second rotary shaft 232, and the main gears 231_2 and 232_2 may be disposed to be engaged with different compound gears (e.g., a first compound gear 233 and a second compound gear 234). For example, the first main gear 231_2 may be engaged with a first gear portion of the first compound gear 233, and the second main gear 232_2 may be engaged with a third gear portion of the second compound gear 234. A second gear portion of the first compound gear 233 may be engaged with a fourth gear portion of the second compound gear 234. Accordingly, the arm parts 221 and 222 of the hinge structure 200 shares a force generated while the first rotation part 211 and the second rotation part are rotated, and they may be rotated at the same or similar time durations and at the same or similar angles.

According to an embodiment, the first shaft body 231_1, onto which one side of the first arm part 221, sides of the cam members 241a, 241b, and 241c, one side of the stopper 235, one side of the center bracket 243a, one side of the shaft bracket 243b, and a first support ring 292_1 are inserted, may be disposed in the first rotary shaft 231, and the first main gear (or first shaft gear) 231_2 may be disposed at an edge (e.g., at a distal end in the x axis direction) of one side of the first rotary shaft 231_1. Additionally, a fixing member (e.g., an E ring) that may prevent separation of components inserted in the first rotary shaft 231 may be coupled to a −x axis end of the first rotary shaft 231. The first main gear 231_2 may be formed in the first rotary shaft 231, and at least a portion of the first main gear 231_2 may be disposed to be engaged with a first portion of the first compound gear 233. One end (e.g., an end in the x axis direction) of one side of the first rotary shaft 231 may be disposed on (or fixed to) one side surface (e.g., an end in the −x axis direction) of the fixing bracket 213.

According to an embodiment, the second rotary shaft 232 may include a second rotary shaft body 231_1, onto which one side of the second arm part 222, an opposite side of a stopper 235, opposite sides of the cam members 241a, 241b, and 241c, an opposite side of the center bracket 243a, an opposite side of the shaft bracket 243b, and a second support ring 292_2 are inserted, and a second main gear (or a second shaft gear) 232_2 disposed at an edge (e.g., at a distal end in the x axis direction) of one side of the second rotary shaft body 231_1. A fixing member (e.g., an E ring) that may prevent separation of components that are inserted into the second rotary shaft 232 similarly to the first rotary shaft 231 may be coupled to a −x axis edge of the second rotary shaft 242. The second main gear 232_2 may be formed in the second rotary shaft 232, and at least a portion of the second main gear 232_2 may be disposed to be engaged with a third portion of the second compound gear 234. One end (e.g., an end in the x axis direction) of one side of the second rotary shaft 232 may be disposed on one side surface (e.g., an end in the −x axis direction) of the fixing bracket 213.

According to an embodiment, the stopper 235 may be disposed between the gears (e.g., the shaft gears 231_2 and 232_2) and the compound gears 233 and 234 and the first arm part 221 and the second arm part 222. Recesses or holes that may fix the shaft gears 231_2 and 232_2 and the compound gears 233 and 234 may be provided on one surface of the stopper 235 in the x axis direction. One surface of the stopper 235 in the −x axis direction may include a boss coupled to one side of the first arm part 221 such that the first arm part 221 is not rotated by a specific angle or more (e.g., about 0 degrees or about 180 degrees or more with respect to the z axis), and a boss coupled to one side of the second arm part 222 such that the second arm part 222 is not rotated by a specific angle or more (e.g., about 180 degrees or about 0 degrees more with respect to the z axis). Furthermore, rings disposed in the y axis or −y axis direction may be disposed in the stopper 235, and portions of the first rotary shaft 231 and the second rotary shaft 232 may be inserted into the rings.

According to an embodiment, one side of the center bracket 243a may be inserted into the first rotary shaft 231, and an opposite side of the center bracket 243a may be inserted into the second rotary shaft 232. The center bracket 243a may be disposed between a second cam member 241b and a third cam member 241c. Furthermore, the center bracket 243a may be disposed between a third elastic body 242c and a fourth elastic body 242d, and a fifth elastic body 242e and a sixth elastic body 242f The center bracket 243a may be fixed to the hinge housing 150 through a coupling member (e.g., a screw). According to an embodiment, the center bracket 243a may include a first elastic member that supports the center bar 270 and a structure, in which a first holding member for decreasing movement of the first elastic member is seated.

According to an embodiment, the shaft bracket 243b may be disposed between the support rings 292_1 and 292_2, and the first elastic body 242a and the second elastic body 242b. The shaft bracket 243b may include ring-shaped wings, into which the first rotary shaft 231 and the second rotary shaft 232 may be inserted, and may include body that supports and connects the wings. According to an embodiment, the center bracket 243a may include a second elastic member that supports the center bar 270 and a structure, in which a second holding member is held. The shaft bracket 243b may guide the first rotary shaft 231 and the second rotary shaft 232 such that a specific interval may be maintained therebetween while they are rotated.

According to an embodiment, the plurality of elastic bodies 242a, 242b, 242c, and 242d, for example, may include a first elastic body 242a disposed between one side of the shaft bracket 243b and the first cam member 241a, a second elastic body 242b disposed between an opposite side of the shaft bracket 243b and the first cam member 241a, a third elastic body 242c disposed between one side of the center bracket 243a and the second cam member 241b, a fourth elastic body 242d disposed between an opposite side of the center bracket 243a and the second cam member 241b, a fifth elastic body 242e disposed between the one side of the center bracket 243a and the third cam member 241c, and a sixth elastic body 242f disposed between the opposite side of the center bracket 243a and the third cam member 241c. The plurality of elastic bodies 242a, 242b, 242c, 242d, 242e, and 242f may provide elastic forces that are necessary for cam operations of the first cam member 241a, the second cam member 241b, and the third cam member 241c. According to an embodiment, to provide consistent hinge force (or a feeling of a detent) during rotation of the electronic device, the first elastic body 242a and the second elastic body 242b (or the third elastic body 242c and the fourth elastic body 242d, or the fifth elastic body 242e and the sixth elastic body 2420 may have the same characteristics. For example, the plurality of elastic bodies 242a, 242b, 242c, 242d, 242e, and 242f may have spring structures that have lengths, thicknesses, and diameters that are the same or similar.

According to an embodiment, the plurality of elastic bodies 242a, 2421b, 242c, 242d, 242e, and 242f may have lengths, thicknesses, or diameters that are different (e.g., the first elastic body 242a and the second elastic body 242b have a first length, a first thickness, and a first diameter that are the same or similar, and the third elastic body 242c and the fourth elastic body 242d have a second length (e.g., a second length that is different from the first length), a second thickness (e.g., a second thickness that is different from the first thickness), and a second diameter (e.g., a second diameter that is different from the first diameter)). According to an embodiment, the fifth elastic body 242e and the sixth elastic body 242f may have a third length (an x axis length), a third thickness (e.g., a thickness of the material that forms the elastic body), and a third diameter (twice of the distance from an x axis center to the edge of the elastic body) that are the same or different. The third length may be the same as or different from at least one of the first length and the second length. The third thickness may be the same as or different from at least one of the first thickness and the second thickness. The third diameter may be the same as or different from at least one of the first diameter and the second diameter.

According to an embodiment, the center bar 270 may have a bar shape, of which its x axis length is larger than its y axis length, may be disposed between the first rotary shaft 231 and the second rotary shaft 232, and thus may be disposed to cover at least a partition space between the first rotary shaft 231 and the second rotary shaft 232. The center bar 270 may be coupled to one side of the center bracket 243a and one side of the shaft bracket 243b in the −z axis direction. The center bar 270 may be moved in the z axis or −z axis direction according to (or in correspondence to or during) rotation of the first arm part 221 and the second arm part 222. For example, the center bar 270 may be lowered in the −z axis direction by a specific distance to provide a space from the display 160 in the folded state of the electronic device 100 and the center bar 270 may be moved in the z axis direction to support the display 160 in the unfolded state of the electronic device 100, such that the display 160 is prevented from being damaged by drop impact or external force in the folded state of the electronic device 100.

As described herein, the hinge structure 200a and 200b according to the embodiment provides a structure for securing a surrounding space, in which the display 160 is folded, based on the compound gears 233 and 234 having a radius and the number of gear teeth that are different from those of the main gears (or the shaft gears) 231_2 and 232_2, in a structure including a gear coupled to the hinge housing 150 and the housings 110 and 120 to share external pressure. Accordingly, the hinge structure 200a and 200b may optimize the number of gear teeth while reducing and restraining collisions of the display 160 and the compound gears 233 and 234.

Figure 5:
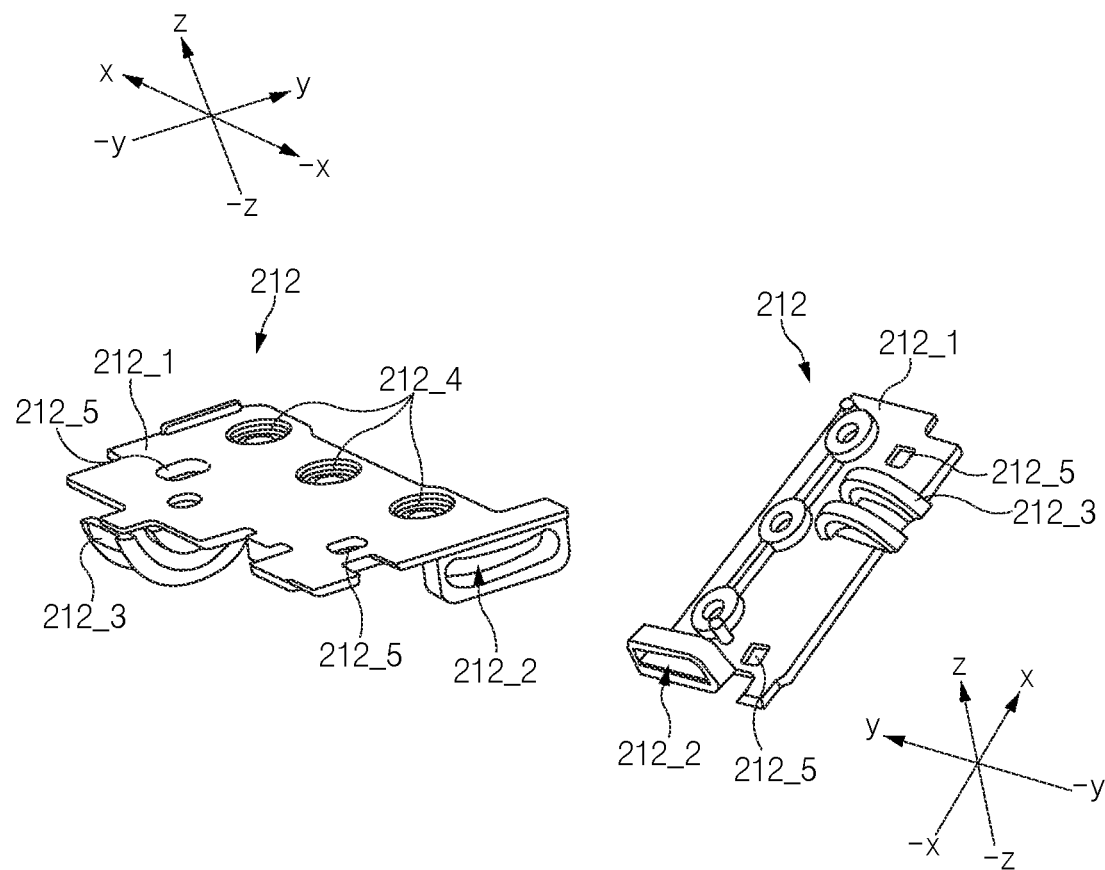
FIG. 5 is a view illustrating an example of a rotation part according to an embodiment.

FIG. 5 is a view illustrating an example of a rotation part according to an embodiment. The rotation part illustrated in FIG. 5 is an example of the second rotation part described above in FIGS. 3 and 4. At least a portion of the second rotation part 212 may have a structure that is symmetrical to the first rotation part 211 in several directions such as leftwards and rightwards with respect to the center lines of the first rotary shaft 231 and the second rotary shaft 232. The second rotation part 212 may have a shape and be made of a material that are the same as those of the first rotation part 211. Although the location of components, for example, the rail of the second rotation part 212 may be different from a location of the rail of the first rotation part 211, overall shapes thereof may be similar. In the following description, the second rotation part 212 will be described as a representative example of the structure of the rotation part of the electronic device.

Referring to FIG. 5, the second rotation part 212 may include a bracket body 212_1, a slide hole 212_2 formed at an end (e.g., a distal end in the −x axis direction) on one side of the bracket body 212_1, a rail 212_3 formed at an end (e.g., a distal end in the −y axis direction) on an opposite side of the bracket body 212_1, and a housing coupling hole 212_4 used for coupling to the second housing 120 (e.g., the second housing 120 of FIG. 1). The first rotation part 211 described above in FIG. 3 or FIG. 4, similar to the second rotation part 212, may include a bracket body, a slide hole, a rail, and a housing coupling hole. A location of the rail of the first rotation part 211 may be different from a location of the rail of the second rotation part 212.

According to an embodiment, the x axis length of the bracket body 212_1 may be larger than its y axis length, at least a portion of a surface thereof, which faces the z axis may be flat, and at least a portion of a surface thereof, which faces the −z axis also may be flat. With reference to the illustrated drawings, the slide hole 212_2 may be formed at a right end (e.g., an end in the −x axis direction) of the bracket body 212_1 to face a downward direction (e.g., −z axis direction). The rail 212_3 may be disposed at an end (e.g., an end in the −y axis direction) of one side of the bracket body 212_1 to face a lower surface (e.g., a surface in the −z axis direction). At least one housing coupling hole 212_4 used for coupling to the second housing 120 may be disposed in the bracket body 212_1. In the illustrated drawings, three housing coupling holes 212_4 are shown, but the disclosure is not limited thereto. For example, two or more housing coupling holes 212_4 may be formed, and the two or more housing coupling holes 212_4 may be disposed to be spaced apart from the bracket body 212_1. According to certain embodiments, at least one bracket coupling hole 212_5 may be disposed in the bracket body 212_1. The bracket coupling hole 212_5 may be coupled to a coupling boss formed in the fixing bracket 213 when the electronic device 100 is in the unfolded state, and may be separated from the coupling boss of the fixing bracket 213 when the electronic device 100 is in the folded state. The number of the bracket coupling hole 212_5 may correspond to the number of the coupling bosses of the fixing bracket 213.

According to an embodiment, the slide hole 212_2 may be disposed at an opposite end (e.g., an end in the −x axis direction) of the bracket body 212_1, and may be disposed at a lower portion of the bracket body 212_1. The length of the slide hole 212_2 in the first direction (e.g., the y axis direction) may be longer than a length thereof in a third direction (e.g., the x axis direction). Accordingly, the second fixing part 252 inserted into the slide hole 212_2 may be slid in any one of the first direction (e.g., the y axis direction) and the second direction (e.g., the −y axis direction) in the slide hole 212_2. The slide hole 212_2 may be disposed to face a surface in a fourth direction (e.g., a surface disposed in the −x axis direction) of the second arm part 222. At least a partial area of the slide hole 212_2 may be aligned with a hole formed on one side of the second arm part 222. Accordingly, at least a portion of the second coupling part 252 may be disposed in the slide hole 212_2 and a hole of the second arm part 222.

According to an embodiment, the rail 212_3 may be disposed at an end (e.g., an end in the −y axis direction) of the bracket body 212_1 in the second direction, and may be disposed at a lower portion of the bracket body 212_1. The rail 212_3 may have an arc shape of a specific angle. The rail 212_3 may be inserted into a rail grove (or a rail type hole) disposed in the fixing bracket 213, and may be rotated along the rail groove in a specific rotation range. According to an embodiment, the rotation range of the rail 212_3 may be included within the angle of an arc that forms the shape of the rail 212_3. For example, the rotation range of the rail 212_3 may be at least a partial range (e.g., a range of 0 degrees to 95 degrees) in the angle of the arc (e.g. −10 degrees to 100 degrees). The rail 212_3 may be rotated between the −z axis and the z axis with respect to a fourth axis 14 formed by the rail groove of the fixing bracket 213.

The housing coupling hole 212_4 may be formed on one side (e.g., an edge of one side that faces the y axis direction) of the bracket body 212_1, and may be formed to pass through a surface (e.g., a surface in the y axis direction) in the first direction and a surface (e.g., a surface in the −y axis direction) in the second direction. Although it is exemplified in the illustrated drawings that three housing coupling holes 212_4 are formed in the bracket body 212_1, the disclosure is not limited to the number.

Figure 6:
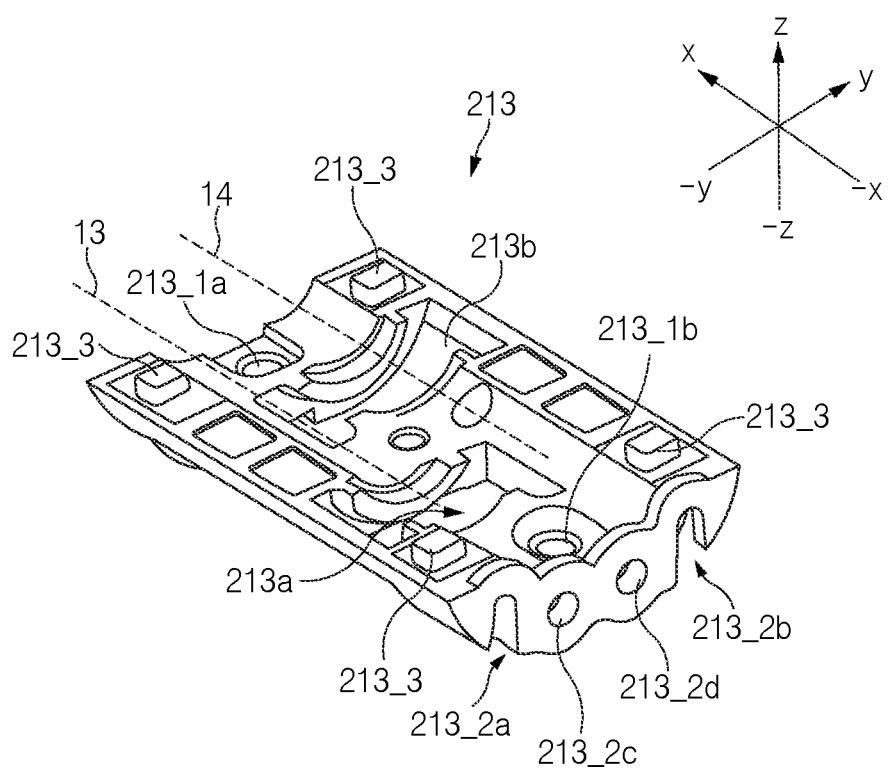
FIG. 6 is a view illustrating an example of a fixed bracket according to an embodiment.

FIG. 6 is a view illustrating an example of a fixed bracket according to an embodiment.

Referring to FIGS. 3 to 6, at least a portion of the shape of the lower surface (e.g., the surface in the −z axis direction) of the fixing bracket 213 may be curved. For example, the lower surface of the fixing bracket 213 may be formed to correspond to an inner shape of the hinge housing (e.g., the hinge housing 150 of FIG. 1). At least a portion of the upper surface (e.g., the surface in the z axis direction) of the fixing bracket 213 may have a flat shape, and rail grooves (or the rail grooves) 213a and 213b may be formed such that the rotary brackets (e.g., the rotation parts 211 and 212 of FIG. 2) are coupled thereto.

According to an embodiment, the fixing bracket 213 may include a first rail groove 213a, of which at least a portion of a z axis cross-section (e.g., a cross-section taken from the z axis direction to the −z axis direction) has an arc shape, and into which the rail of the first rotation part 211 is inserted from the first direction (e.g., the y axis direction) to the second direction (the −y axis direction). According to an embodiment, the fixing bracket 213 may include a second rail groove 213b, of which at least a portion of a z axis cross-section (e.g., a cross-section taken from the z axis direction to the −z axis direction) has an arc shape, and into which the rail 212_3 of the second rotation part 212 is inserted from the second direction (e.g., the −y axis direction) to the first direction (the y axis direction). The first rail groove 213a may be disposed to be biased to the −y axis direction as compared with the second rail groove 213b, and the second rail groove 213b may be disposed to be biased to the y axis direction as compared with the first rail groove 213a. The first rail groove 213a may be rotated about the third axis 13, and the second rail groove 213b may be rotated about the fourth axis 14.

The third axis 13 and the fourth axis 14, which may be imaginary axes, may be imagined to be formed on the upper side of the upper surface (e.g., the surface in the z axis direction) of the fixing bracket 213, and the third axis 13 and the fourth axis 14 may be spaced apart from each other because the first rail groove 213a is disposed to be biased in the −y axis direction and the second rail groove 213b is disposed to be biased in the y axis direction. According to an embodiment, the fixing bracket 213 may include a first recess 213_2a formed at a side thereof disposed in the −x axis direction and in which one end of the first rotary shaft 231 is disposed, and a second recess 213_2b, in which one end of the second rotary shaft 232 is disposed. According to an embodiment, the fixing bracket 213 may include a third recess 213_2c formed at a side thereof in the −x axis direction and in which the first compound gear 233 is held, and a fourth recess 213_2d, in which the second compound gear 234 is held. The third recess 213_2c and the fourth recess 213_2d may be disposed between the first recess 213_2a and the second recess 213_2b.

According to an embodiment, the fixing bracket 213 may include a first fixing hole 213_1a and a second fixing hole 213_1b that are used to fix the fixing bracket 213 to the hinge housing 150. In the electronic device 100, the fixing bracket 2134 may be fixed to the hinge housing 150 by using a coupling member (e.g., a coupling member such as a screw). According to an embodiment, the first fixing hole 213_1a and the second fixing hole 213_1b may be disposed to be symmetrical to each other in a diagonal direction from the upper surface (e.g., a surface in the z axis direction) of the fixing bracket 213 to fix the fixing bracket 213 to the hinge housing 150 more firmly and stably.

According to an embodiment, the fixing bracket 213 may include at least one bracket boss 213_3 inserted into a bracket coupling hole (e.g., the bracket coupling hole 212_5 of the second rotation part 212) formed in the first rotation part 211 and the second rotation part 212. That is, the bracket coupling hole 212_5 also may be formed in the second rotation part 212 in the same way as the first rotation part 211, and the fixing bracket 213 may include bracket bosses having the same shape at locations that are symmetrical to the bracket boss 213_3 inserted into the bracket coupling hole of the first rotation part 211 and the second rotation part 212. According to an embodiment, a plurality of bracket bosses 213_3 may be disposed on a surface of the fixing bracket 213 in the z axis direction. For example, a plurality of bracket bosses 213_3 may be disposed at corners of a surface of the fixing bracket 213 in the z axis direction.

Figure 7:
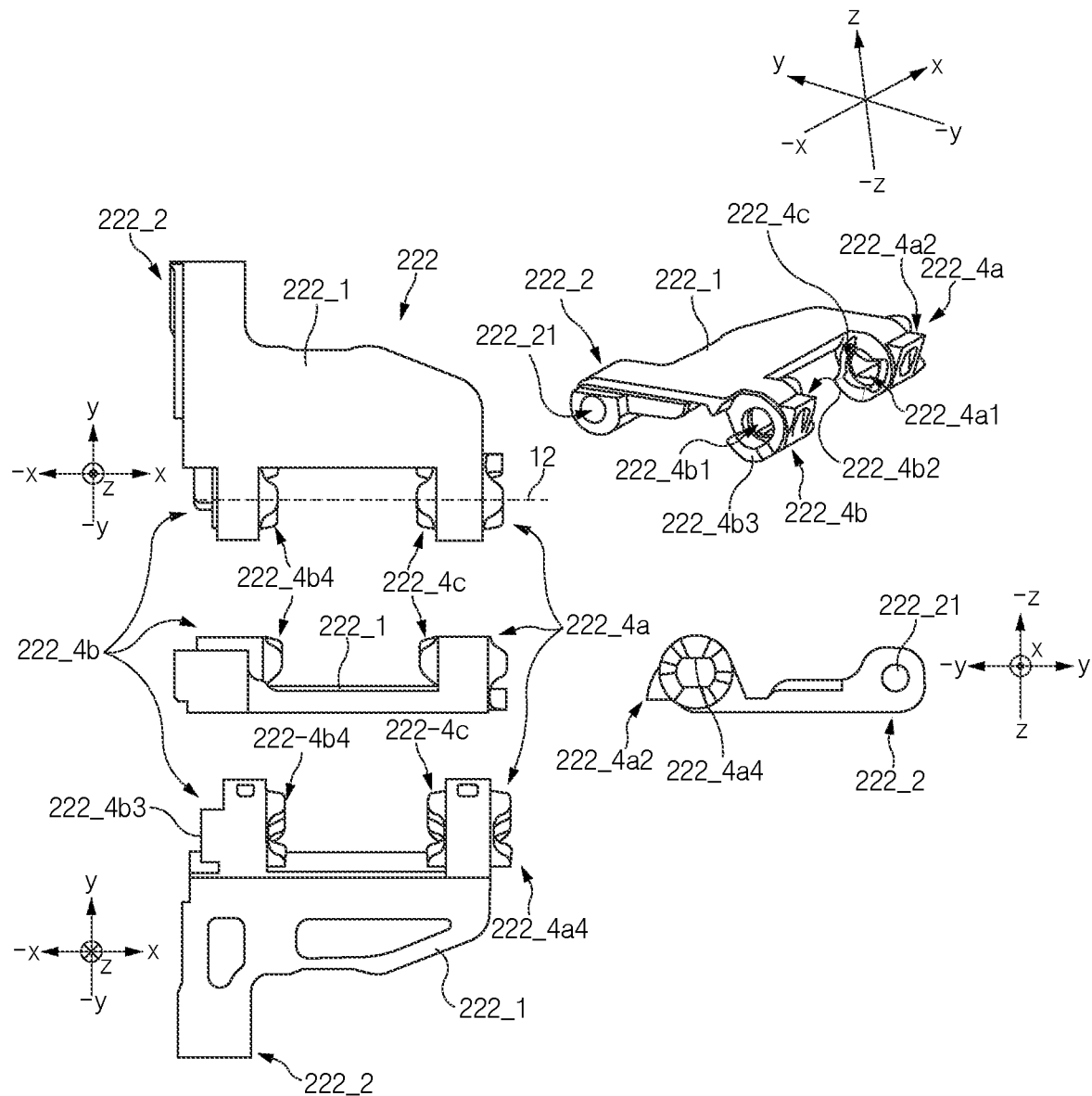
FIG. 7 is a view illustrating an example of an arm part according to an embodiment.

FIG. 7 is a view illustrating an example of an arm part according to an embodiment. The arm part illustrated in FIG. 7 is a view illustrating a second arm part 222 shown in FIG. 3. The second arm part 222 may have a shape (e.g., shape that is symmetrical with respect to the x axis) that is similar to that of the first arm part 221, and may have a size and be made of a material that are the same as those of the first arm part 221. In the following description, between the first arm part and the second arm part of FIG. 3, the second arm part will be referenced. According to certain embodiments, disposition angles of a first coupling hole 222_4a1 of the first arm part 221 and a second coupling hole 222_4b1 of the second arm part 222 may be different.

Referring to FIGS. 3 and 7, the second arm part 222 may be coupled to the second rotation part 212 through the second coupling part (e.g., the second coupling part 252 of FIG. 3), and may be rotated in conjunction with the second rotation part 212 during a hinge rotation operation. According to an embodiment, the second arm part 222 may include a basic body 222_1, a connector 222_2, a third cam structure 222_4a, and a fourth cam structure 222_4b. Similarly, the first arm part 221 may include a basic body corresponding to the basic body 222_1, a connector corresponding to the connector 222_2, a fifth cam structure corresponding to the third cam structure 222_4a, and a sixth cam structure corresponding to the fourth cam structure 222_4b. Here, the numbering (e.g., the third cam structure, the fourth cam structure, the fifth cam structure, and the sixth cam structure) of the cam structures are for identification of the components, and is not relevant to the cam operations of the cam structure. Thus, the numbering of the cams of the arm parts 221 and 222 may be changed if necessary.

According to an embodiment, at least a portion of an upper surface (e.g., the surface disposed in the z axis direction) of the basic body 222_1 may be formed flat. The connector 222_2 may be disposed at at least a portion of a lower surface (e.g., the surface in the −z axis direction) of an upper edge (e.g., a distal end in the y axis direction) of the basic body 221_1. The connector 222_2 may be a ring shape or a pipe shape having a specific thickness. For example, the connector 222_2 may include a hole 222_21 that is opened in the third direction (e.g., the x axis direction or the −x axis direction). At least a portion of the second coupling part 252 may be disposed in the hole 222_21 of the connector 222_2. In this regard, a size of the hole 222_21 of the connector 222_2 may have a size that is similar to a diameter of the second coupling part 252. The third cam structure 222_4a and the fourth cam structure 222_4b may be disposed on a lower surface (e.g., the surface in the −z axis direction) of an edge (e.g., a distal end in the −y axis direction) on a lower side of the basic body 222_1. The third cam structure 222_4a and the fourth cam structure 222_4b may be disposed at an edge of the basic body 222_1 in the −y axis direction, and the connector 222_2 may be disposed at an edge of the basic body 222_1 in the y axis direction.

According to an embodiment, the third cam structure 222_4a may include a first coupling hole 222_4a1 that faces the −x axis direction, a first holding part 222_4a2 for supporting the center bar 270, a first cam boss 222_4a4 for a cam operation, and a second cam boss 222_4c disposed in the −y axis direction to perform the cam operation.

According to an embodiment, at least a portion of the second rotary shaft 232 may be inserted into the first coupling hole 222_4a1. The first coupling hole 222_4a1 may have a shape that is the same as or similar to a cross-section (e.g., a cross-section taken from the z axis direction to the −z axis direction) of one side of the second rotary shaft 232. For example, at least a partial cross-section of the first coupling hole 222_4a1 (e.g., a cross-section of the first coupling hole 222_4a1 when a cross-section of the third cam structure 222_4a is taken from the z axis direction to the −z axis direction) may correspond to a cross section of the second rotary shaft 232. The first coupling hole 222_4a1 may be disposed on the same axis (e.g., the second axis 12) as the second coupling hole 222_4b1 of the fourth cam structure 222_4b.

According to an embodiment, the first holding part 222_4a2 may protrude from one side of a peripheral portion that forms the first coupling hole 222_4a1 in the −y axis direction by a specific length. At least a portion of the z axis cross-section of the first holding part 222_4a2 may have a triangular shape. According to an embodiment, the size of the z axis cross-section of the first holding part 222_4a2 may gradually decrease as it goes from the y axis to the −y axis. An upper surface (e.g., the surface that faces the z axis direction) of the first holding part 222_4a2 may be lower than an upper surface (e.g., the surface that faces the z axis direction) of the basic body 222_1 with respect to the z axis. According to an embodiment, the first holding part 222_4a2 may protrude from a side (e.g., one point in the −y axis direction) of a peripheral portion of the first coupling hole 222_4a1 in the −y axis direction while being located between an upper side (e.g., one point in the z axis direction) and a lower side (e.g., one point in the −z axis direction) of the peripheral portion that forms the first coupling hole 222_4a1. The first holding part 222_4a2 may be integrally formed with the peripheral portion that forms the first coupling hole 222_4a1. In this regard, the first holding part 222_4a2 may be made of the same material as that of the peripheral portion of the first coupling hole or the basic body 222_1.

According to an embodiment, the first cam boss 222_4a4 may protrude from a side surface of the peripheral portion of the first coupling hole 222_4a1, which face the x axis direction, in the x axis direction by a specific height, and protrusion heights thereof may vary at different points on the first cam boss 222_4a4. For example, a z axis cross-section (e.g., a cross-section from the z axis direction to the −z axis direction) of the first cam boss 222_4a4 may be circular, or at least a portion thereof includes a line and a remaining portion thereof may include a curve (at least a portion thereof may include a D-cut shape). The first cam boss 222_4a4 may have a convex-concave shape in the x axis direction. At least a portion of the first cam boss 222_4a4 having the convex-concave shape in the x axis direction may include a curve section. Heights of mountains of the convex-concave shape are the same in the x axis direction, and depths of valleys of the convex-concave shape may be the same in the −x axis direction. Central portions of the mountains and the valleys of the convex-concave shape may include flat areas of a specific length. The second cam boss 222_4c may have a shape that is the same as or similar to that of the first cam boss 222_4a4. The second cam boss 222_4c may be disposed in a direction that is opposite to a direction, in which the first cam boss 222_4ea4 is formed, for example, in the −x axis direction.

According to an embodiment, the fourth cam structure 222_4b may include a second coupling hole 222_4b1 of a uniform diameter that faces the −x axis direction from the x axis, a second holding part 222_4b2 for supporting the center bar 270, a boss 222_4b3, at least a portion of which is engaged with the stopper 236, and a third cam boss 222_4b4 for the cam operation. The fourth cam structure 222_4b may be disposed to be spaced apart from the third cam structure 222_4a by a specific interval while being disposed on one side of the basic body 222_1. The spacing distance between the third cam structure 222_4a and the fourth cam structure 222_4b may depend on the size or shape of at least one of the elastic bodies disposed between the third cam structure 222_4a and the fourth cam structure 222_4b, the cam member, and the center bracket 243a.

According to an embodiment, at least a portion of the second rotary shaft 232 may be inserted into the second coupling hole 222_4b1. The second coupling hole 222_4b1 may have a shape that is the same as or similar to a cross-section (e.g., a cross-section taken from the z axis direction to the −z axis direction) of one side of the second rotary shaft 232. A cross-section (e.g., a cross-section taken from the z axis direction to the −z axis direction) of at least a portion of the second coupling hole 222_4b1 may have the same shape as that of the first coupling hole 222_4a1. The second coupling hole 222_4b1 may be disposed on the same axis (e.g., the second axis 12) as the first coupling hole 222_4a1 of the third cam structure 222_4a.

According to an embodiment, the second holding part 222_4b2 may have a shape that is the same as or similar to that of the first holding part 222_4a2. For example, the second holding part 222_4b2 may be formed between an upper side (e.g., a distal side in the z axis direction) and a lower side (e.g., a distal side in the −z axis direction) of the peripheral portion of the second coupling hole 222_4b1, and may protrude in the −y axis direction. According to an embodiment, similarly to the first holding part 222_4a2, the second holding part 222_4b2 may have a shape, of which the width of the protrusion gradually decreases as it goes from the z axis direction to the −z axis direction.

According to an embodiment, the boss 222_4b3 may protrude in the −x axis direction by a specific length while having a specific thickness, on a surface of the peripheral portion of the second coupling hole 222_4b1, which faces the −x axis direction. According an embodiment, the protrusion height of the boss 222_4b3 may correspond to the shape of one side of the stopper 236. A thickness of the boss 222_4b3 may be the same as the width of the peripheral portion of the second coupling hole 222_4b1, and may have an area that is smaller than the entire area of the peripheral portion. The boss 222_4b3 may define a limit angle, by which the second arm part 222 is rotated in a specific angle range (e.g., 0 degrees to 100 degrees or 0 degrees to −100 degrees).

According to an embodiment, the third cam boss 222_4b4 may have a shape that is the same as or similar to that of the first cam boss 222_4a4. According to an embodiment, the third cam boss 222_4b4 may include a convex-concave shape that protrudes in the x axis direction, on a surface of the peripheral portion of the second coupling hole 222_4b1, which faces the x axis direction. The third cap boss 222_4b4 may include at least one mountain and at least one valley. The central portion of the mountain or the valley of the third cam boss 222_4b4 may be flat. The size (e.g., size of the flat area) of a specific area of the central portion of the mountain or the valley of the third cam boss 222_4*b*4 may be the same as the size of a specific area of the central portion of the mountain or the valley of the first cam boss 222_4*a*4. According to an embodiment, the size (e.g., size of the flat area) of a specific area of the central portion of the mountain or the valley of the third cam boss 222_4*b*4 may be different from as the size of a specific area of the central portion of the mountain or the valley of the first cam boss 222_4*a*4 such that a hinge force (or a feeling of a detent) may be provided more smoothly.

According to an embodiment, the number and directions of the bosses (or convex-concave shape or the mountains and the valleys) of the third cam structure 222_4*a* and the fourth cam structure 222_4*b* may be different than those shown in the figures. For example, according to certain embodiments, the second cam boss 222_4*c* of the third cam structure 222_4*a* may be removed. Furthermore, a plurality of bosses also may be disposed in the fourth cam structure 222_4*b* in different directions (e.g., the x axis direction and the −x axis direction). Directions of the fixed cams can also be disposed such that the fixed cams are engaged with the cam structures 222_4*a* and 222_4*b* according to disposition directions of the bosses of the cam structures 222_4*a* and 222_4*b*.

According to an embodiment, the second arm part 222 of the above-described structure may be rotated about the second rotary shaft 232. In a state, in which one side of the first cam member 241*a* is engaged with the third cam structure 222_4*a* and one side of the second cam member 241*b* is engaged with the fourth cam structure 222_4*b*, the second elastic body 242*b* may provide an elastic force to the one side of the first cam member 241*a* and the third cam structure 222_4*a*, and the fourth elastic body 242*d* may provide an elastic force to the one side of the second cam member 241*b* and the fourth cam structure 222_4*b*. According to an embodiment, the third cam structure 222_4*a* and the fourth cam structure 2224*b* may perform cam operations at the same time or in multiply stages. According to an embodiment, the electronic device 100 may divide the cam structure for cam operations to the third cam structure 222_4*a* and the fourth cam structure 222_4*b*, and thus may provide a high elastic force without increasing the thickness of the electronic device 100 because the sizes of the elastic bodies (e.g., the diameters of the elastic bodies) or the thicknesses of the elastic bodies (e.g., the widths of lines that form the elastic bodies) are not increased. Furthermore, because the electronic device 100 may provide a robust and improved hinge force (or feeling of a detent or pressure) using the high elastic forces, the folded or unfolded state of the electronic device 100 may be stably provided even when a tensile force, a strength, or a repulsive force (e.g., an increased thickness) of the display is increased. The electronic device 100 may provide various holding angles more stably by using the arm part including the plurality of cam structures.

Meanwhile, the second arm part 222 including the third cam structure 222_4*a* and the fourth cam structure 222_4*b*, which have been described above, may have configurations and shapes that are the same as or similar to those of the first arm part 221 including the first cam structure 221_4*a* and the second cam structure 221_4*b*, with respect to the first axis 11 or the second axis 12.

Figure 8:
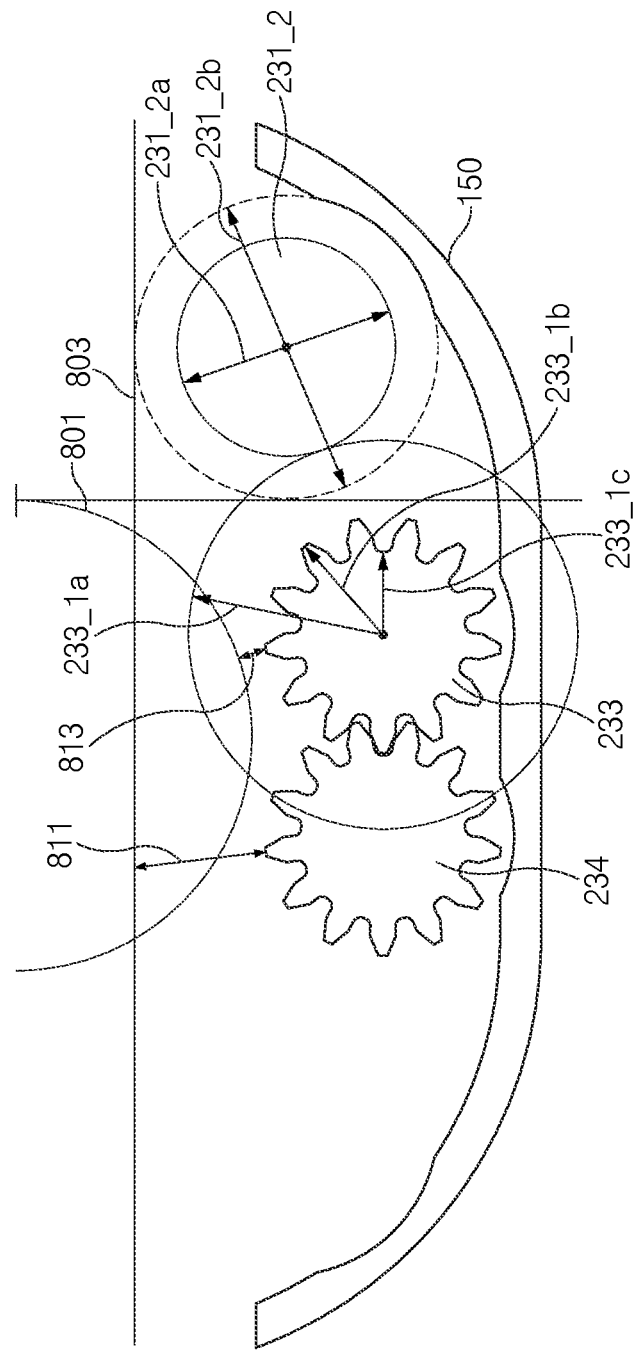
FIG. 8 is a view illustrating a spatial disposition of a display and a gear structure according to a change in a state of an electronic device according to an embodiment.

FIG. 8 is a view illustrating a spatial disposition of a display and a gear structure according to a change in a state of an electronic device according to an embodiment.

Referring to FIGS. 1 to 8, the electronic device 100 according to the embodiment may include a display 160, a hinge structure, and a hinge housing 150, in which at least a portion of the hinge structure is seated. The illustrating drawings illustrate compound gears 233 and 234 and some main gears (e.g., the first main gear 231_2) of the hinge structure. The electronic device 100 may be in the folded state (or closed state) or the unfolded state (or opened state), or be opened at various holding angles (e.g., an angle between the first housing 110 and the second housing 120 is larger than 0 degrees and smaller than 180 degrees). When the electronic device 100 is in the unfolded state, the display 160 may have an unfolded flat state 803. When the first compound gear 233 (or the second compound gear 234) has the same size as illustrated, the minimum distance (or minimum linear distance) between the display 160 in the flat state 803 and the first compound gear 233 (or the second compound gear 234) may be a first distance 811. Because the display 160 in the flat state 803 is spaced apart from the first compound gear 233 (or the second compound gear 234) by the first distance 811 when the electronic device 100 is in the unfolded state, collision of the display 160 and the compound gears 233 and 234 may be prevented even when an external pressure or impact occurs on the electronic device.

When the electronic device 100 is in the folded state, the display 160 may have a folded state 801. When the first compound gear 233 (or the second compound gear 234) has the same size as illustrated, the minimum distance between the folded portion (e.g., the central portion 163) of the display 160 in the folded state 801 and the first compound gear 233 (or the second compound gear 234) may be a second distance 813 (e.g., a distance that is smaller than the first distance 811). The minimum distance (e.g., the second distance 813) is necessary such that the display 160 and the compound gears 233 and 234 are prevented from colliding with each other even when an external pressure or impact is generated.

According to an embodiment, the first compound gear 233 may have a first radius 233_1*a*, a second radius 233_1*b*, and a third radius 233_1*c*. The first radius 233_1*a* may include a distance for gear connection of the first compound gear 233 with the first main gear 231_2. The first radius 233_1*a* may be changed according to the size of the first main gear 231_2 or the location of the first main gear 231_2. The first radius 233_1*a* may be changed according to the size and the location of the second compound gear 234 provided in a way that is the same as or similar to the first compound gear 233. According to an embodiment, the first radius 233_1*a* may be changed according to the size and the location of the first main gear 231_2, sizes and locations of the first compound gear 233 and the second compound gear 234, and the size and the location of the second main gear 232_2. For example, the first radius 233_1*a* may be a length (a sum of a distance from the center point to a bottom land (a bottom surface of a valley between gear teeth) of the first compound gear 233 such that the first compound gear 233 is geared with the gear teeth of the first main gear 231_2, and a height from the bottom land to a top land of the gear tooth (a distance from a bottom of a tooth root to a top of the tooth)) from the center point of the first compound gear 233 to a top land of a specific gear tooth. The second radius 233_1*b* may include a distance from the center point of the first compound gear 233 to a tip end of a specific gear tooth. The second radius 233_1*b* may include a length for gear connection with another adjacent compound gear (e.g., the second compound gear 234). The third radius 233_1*c* may include a distance from the center point of the first compound gear 233 to a bottom land (a bottom surface of a valley between gear teeth) of a specific gear tooth. For example, the third radius 233_1c may include a distance for gear connection of the first compound gear 233 with the first main gear 231_2. The third radius 233_1c may be changed according to a size of the first main gear 231_2 or a location of the first main gear 231_2. The third radius 233_1c may be changed according to a size and a location of the second compound gear 234 provided in a way that is the same as or similar to the first compound gear 233.

According to various embodiments, the third radius 233_1c may be changed according to a size and a location of the first main gear 231_2, sizes and locations of the first compound gear 233 and the second compound gear 234, and a size and a location of the second main gear 232_2.

A center axis of the first main gear 231_2 may be located higher than a center axis of the first compound gear 233 (or the second compound gear 234) in the z axis direction (e.g., a direction from a bottom surface of the hinge housing 150 to a front surface of the display 160). The first main gear 231_2 may have a first diameter 231_2a corresponding to twice the radius from the center point to the root (e.g. bottom surface) of the gear tooth, and a second diameter 231_2b corresponding to twice the radius from the center point to a tip end of a gear tooth, and the second diameter 231_2b may be restricted to have a size so that the first main gear 231_2 does not collide with the display 160 in the flat state 803.

As described above, the first compound gear 233 may have a minimum distance (e.g., the second distance 813) from the display 160 in the folded state 801 while being geared with the second compound gear 234, and may have a multi-stepped gear shape to have a size, by which the first compound gear 233 may be geared with the first main gear 231_2. Similarly, the second compound gear 234 may have a minimum distance (e.g., the second distance 813) from the display 10 in the folded state 801 while being geared with the first compound gear 233, and may have a multi-stepped gear shape to have a size, by which the second compound gear 234 may be geared with the second main gear 232_2.

Figure 9:
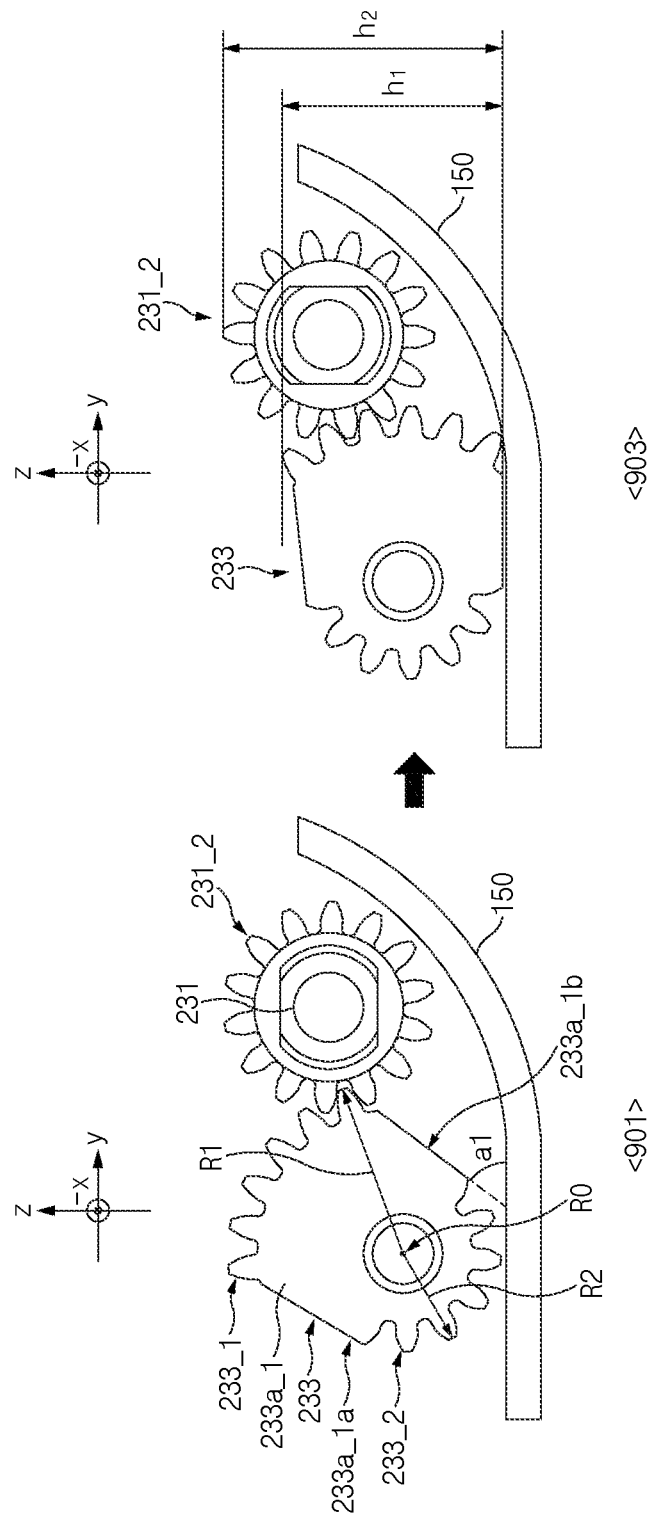
FIG. 9 is a view illustrating a portion of a disposition structure of gears in a hinge housing in an electronic device structure according to an embodiment.

FIG. 9 is a view illustrating a portion of a disposition structure of gears in a hinge housing in an electronic device structure according to an embodiment.

As described above in FIG. 8, the first compound gear 233 may be connected to the first main gear 231_2 while being geared with the adjacent second compound gear 234 and maintaining the second distance 813 of the display 160 in the folded state 801. In this regard, referring to FIGS. 1 to 9, at least a portion of the electronic device 100 may include a hinge housing 150, and a first compound gear 233 and a first main gear 231_2 of a hinge structure disposed in the hinge housing 150. FIG. 9 illustrates only the first compound gear 233 and the first main gear 231_2 to explain a gear structure according to an embodiment, the electronic device 100 may further include the second compound gear 234 geared with the first compound gear 233 and formed similarly to the first compound gear 233, and the second main gear 232_2 geared with the second compound gear 234 and formed similarly to the first main gear 231_2.

The first main gear 231_2 may be disposed at an edge (e.g., an x axis edge of the first rotary shaft body 231_1) of one side of the first rotary shaft 231. According to an embodiment, the first rotary shaft body 231_1 may be disposed at a central portion of the first main gear 231_2. The first main gear 231_2 may have a diameter that is larger than the first rotary shaft body 231_1, and may have a specific number of gear teeth. The size of the first main gear 231_2, as described above in FIG. 8, may be determined according to the location of the lower end of the display 160 in the flat state 803. A specific gear tooth of the first main gear 231_2 may be geared with the first gear portion 233_1 of the first compound gear 233. A z axis cross-section of the first main gear 231_2 may be circular, and the gear teeth disposed in the first main gear 231_2 may be disposed at a specific interval over the entire circle of the first main gear 231_2. According to another embodiment, the gear teeth of the first main gear 231_2 may be formed only at a portion of the circle.

The first compound gear 233 may include a first gear body 233a_1 including a portion extending in one direction (e.g., a direction between the z axis and the y axis) with respect to a center point R0 and a portion extending in an opposite direction (e.g., a direction between the z axis and the −y axis), a first gear portion 233_1 formed at an edge of the first gear body 233a_1 in one direction and geared with the first main gear 231_2, and a second gear portion 233_2 formed at an edge of the first gear body 233a_1 in an opposite direction and geared with the second compound gear 234 described above in FIG. 8.

The first gear body 233a_1 may include a first corner 233a_1a formed on a left side of an imaginary line in the z axis that crosses the center point RO, and a second corner 233a_1b formed on a right side of the imaginary line in the z axis that crosses the center point R0. The first gear portion 233_1 may be disposed at an edge of the first gear body 233a_1 in a diagonal direction between the z axis and the y axis with respect to the center point R0, and the second gear portion 233_2 may be disposed in a direction (e.g., a diagonal direction in the −z axis and −y axis directions) that is opposite to the first gear portion 233_1 with respect to the center point R0. According to another embodiment, the first gear portion 233_1 and the second gear portion 233_2 may be disposed to be symmetrical to each other with respect to the center point R0.

A distance of top ends (e.g., tip lands) of the plurality of gear teeth of the first gear portion 233_1 with respect to the center point R0 (or the center of weight) of the first compound gear 233 may be the first radius R1 (a radius from the center point R0 to an upper end of a top of the tooth). The first gear portion 233_1 may include gear teeth disposed in an angle range (e.g., a specific angle range in the first direction between the z axis and the y axis) with respect to the center point R0. The first gear portion 233_1 may be geared with the gear teeth on one side of the first main gear 231_2.

A distance of top ends of the plurality of gear teeth of the second gear portion 233_2 with respect to the center point R0 (or the center of weight) of the first compound gear 233 may be the second radius R2 (a radius from the center point R0 to a top of the tooth). The second radius R2 may be smaller than the first radius R1. The second gear portion 233_2 may include gear teeth disposed in an angle range (e.g., a specific angle range between the −z axis and the −y axis) in the second direction with respect to the center point R0. According to another embodiment, the second gear portion 233_2 may be disposed to be symmetrical to the first gear portion 233_1 with respect to the center point R0. The second gear portion 233_2 may be geared with gear teeth on one side of another adjacent compound gear (e.g., the second compound gear 234). The first gear portion 233_1 and the second gear portion 233_2 may be disposed on the same plane.

According to an embodiment, when the electronic device 100 is in the unfolded state, as in state 901, a first angle a1 may be formed between the first compound gear 233 and a bottom surface of the hinge housing 150. Furthermore, the first angle a1 may be formed between the second corner 233a_1b of the first compound gear 233 and a bottom surface of the hinge housing 150. Even when the first angle a1 is formed between the second corner 233a_1b of the first compound gear 233 and the bottom surface of the hinge housing 150, a shortest distance between the first compound gear 233 and the display may be the same as or similar to a shortest distance between the first main gear 231_2 and the display 160. The distance between the first compound gear 233 and the display 160 or the distance between the first main gear 231_2 and the display 160 is maintained at a specific distance, and thus collision of the display 160 and the first compound gear 233 (or the first main gear 231_2) may be avoided even when an external pressure or impact occurs.

According to an embodiment, when the electronic device 100 is in the folded state (e.g., a state in which a distance between an outer edge of the first housing 110 and an outer edge of the second housing 120 is at a minimum distance or a minimum linear distance), as in state 903, the first compound gear 233 and a bottom surface of the hinge housing 150 may be disposed in parallel. More specifically, the second corner 233a_1b of the first compound gear 233 and the bottom surface of the hinge housing 150 may be disposed in parallel. When the second corner 233a_1b of the first compound gear 233 is disposed in parallel to the bottom surface of the hinge housing 150, a z axis uppermost height h1 of the first compound gear 233 (e.g., an uppermost height of the first compound gear 233 from an inner flat bottom surface of the hinge housing 150 in the z axis direction) may be lower than a z axis uppermost height of the first main gear 231_2 (e.g., an uppermost height of the first main gear 231_2 from the inner bottom surface of the hinge housing 150 in the z axis direction). Accordingly, as described in FIG. 8, the deeper bottom of the display 160 in the folded state is lowered to an inside of the hinge housing 150 as compared with the flat state, a space may be secured such that the display 160 does not collide with the first compound gear 233. Correspondingly, even when an external pressure or impact occurs, collision of a central portion of the display 160 in the folded state and the first compound gear 233 (or the first main gear 231_2) may be avoided.

Figure 10:
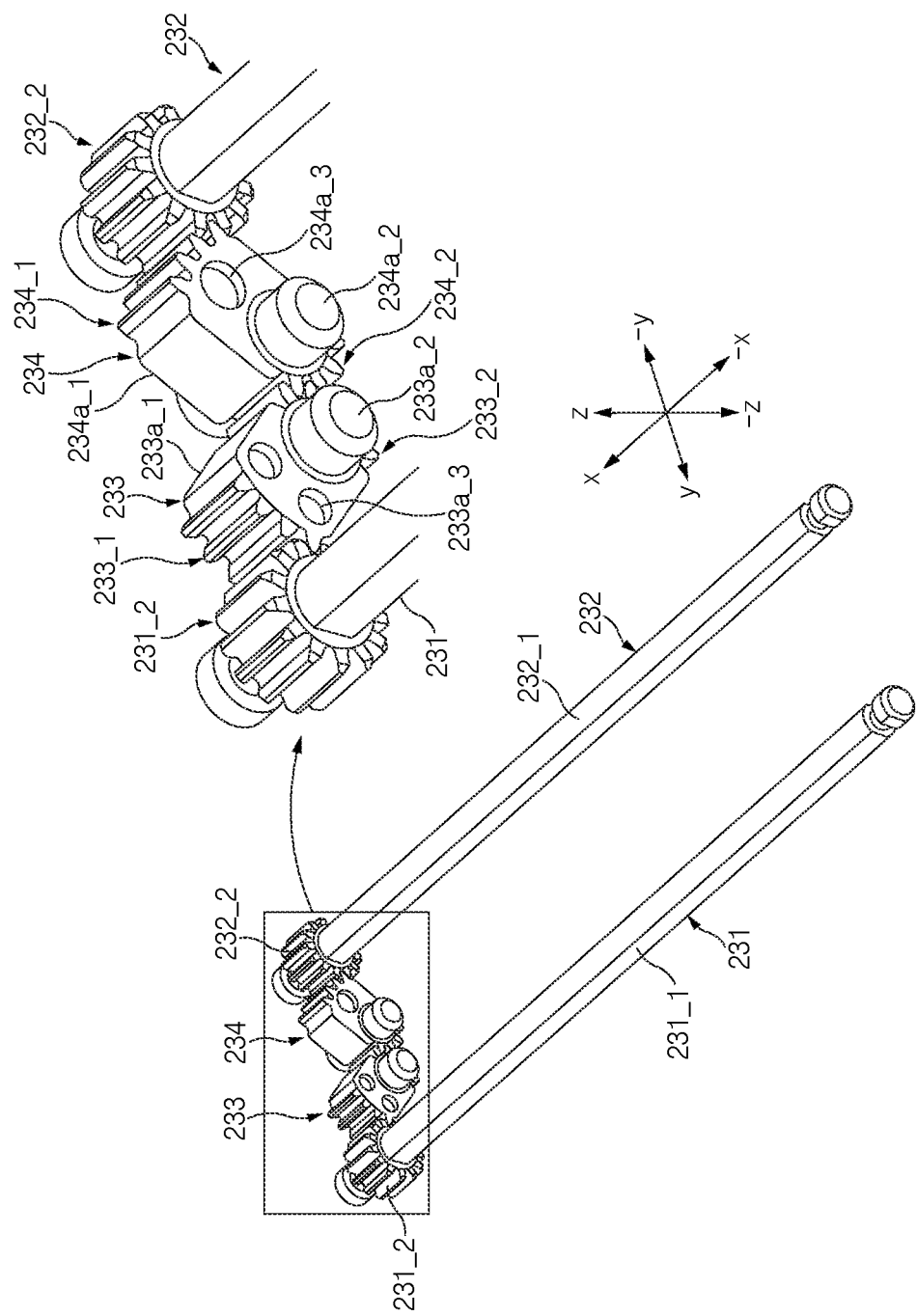
FIG. 10 is a view illustrating an example of shafts and compound gears of a hinge structure of an electronic device according to an embodiment.
Figure 11:
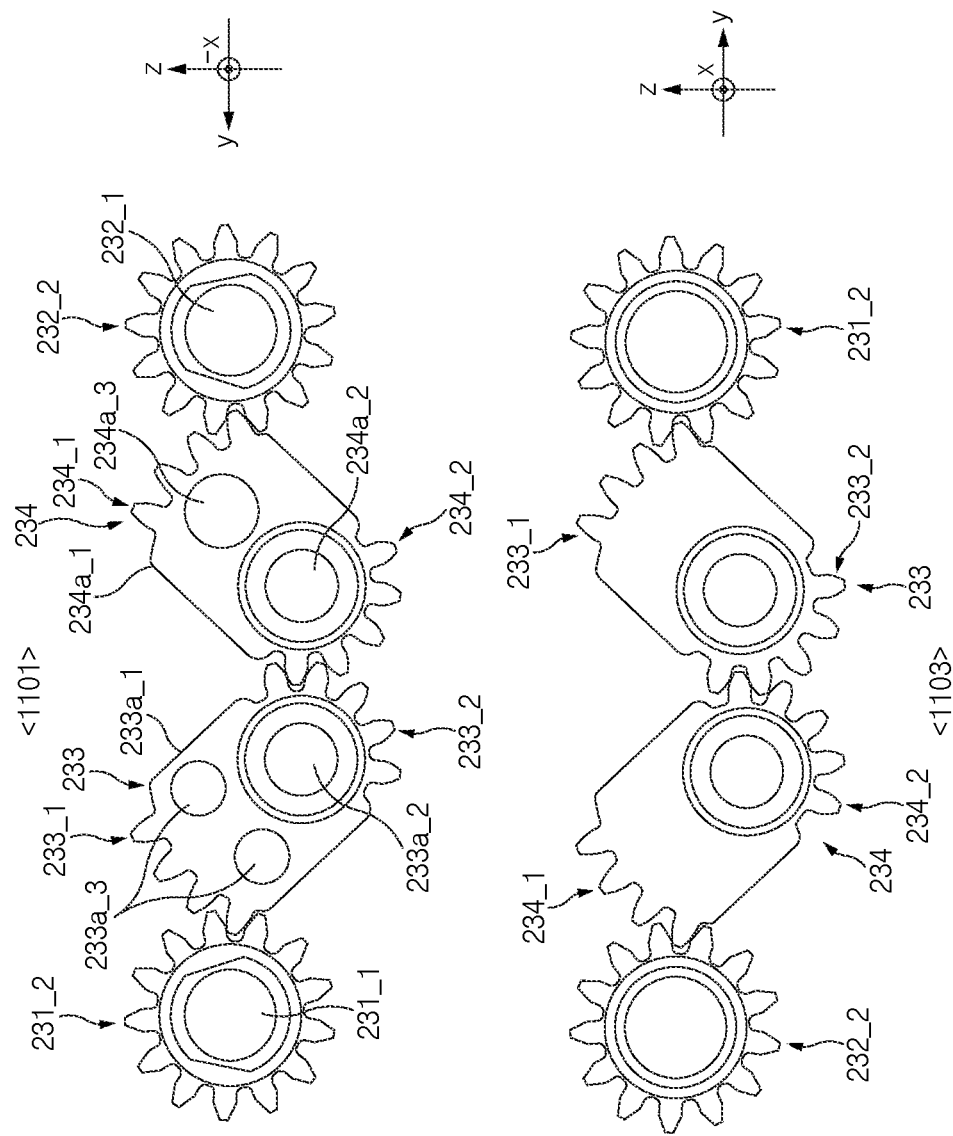
FIG. 11 is a view illustrating an example of front and rear surfaces of main gears and compound gears of a hinge structure according to an embodiment.
Figure 12:
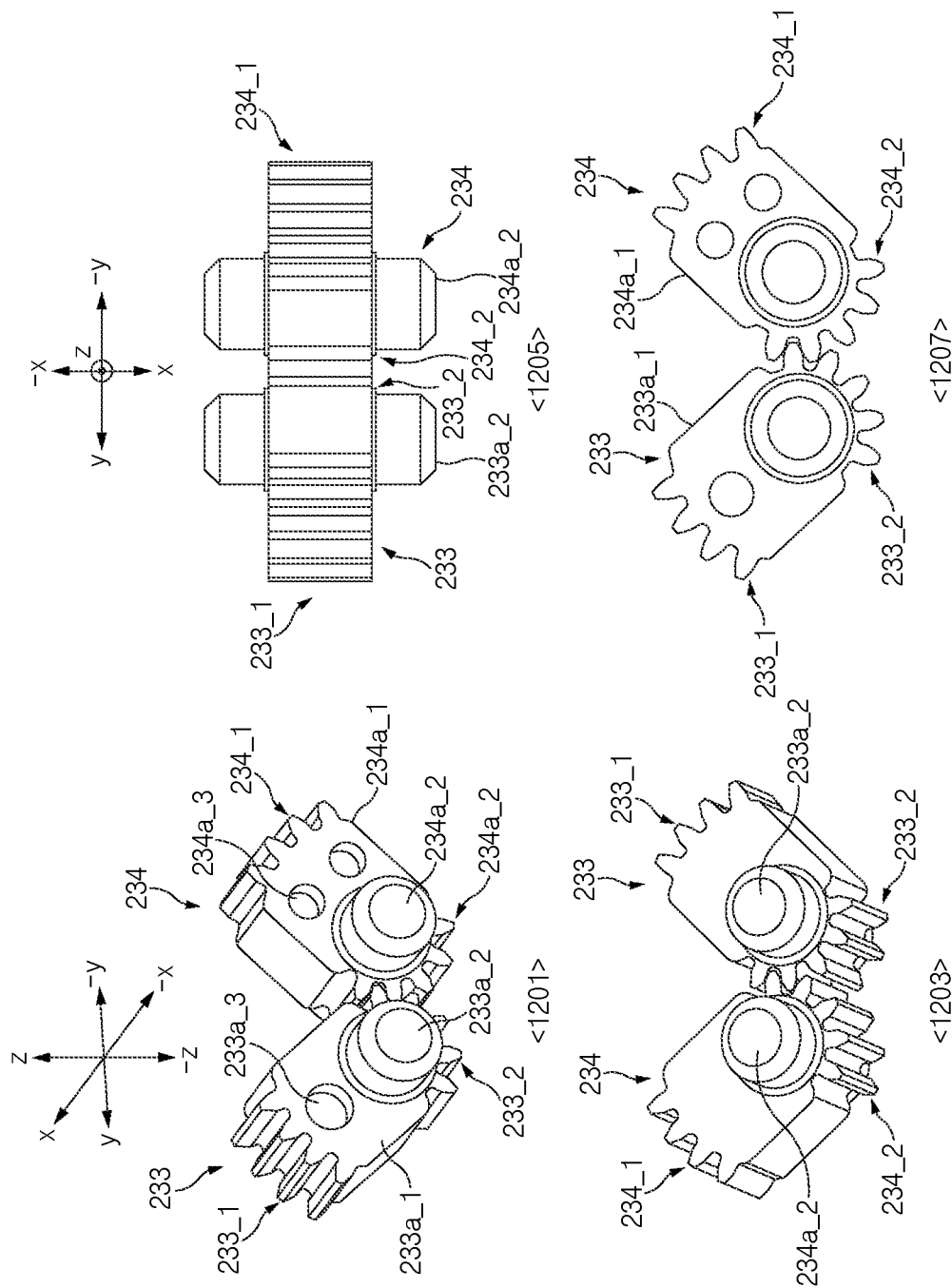
FIG. 12 is a view illustrating an example of a disposition state of compound gears at various angles according to an embodiment.

FIG. 10 is a view illustrating an example of rotary shafts and compound gears of a hinge structure of an electronic device according to an embodiment. FIG. 11 is a view illustrating an example of front and rear surfaces of main gears and compound gears of a hinge structure according to an embodiment. FIG. 12 is a view illustrating an example of a disposition state of compound gears at various angles according to an embodiment. In FIG. 11, 1101 illustrates a disposition form of the main gears 231_2 and 232_2 and the compound gears 233 and 234 viewed from the −x axis direction, and 1103 illustrates a disposition form of the main gears 231_2 and 232_2 and the compound gears 233 and 234 viewed from the x axis direction. In FIG. 12, 1201 illustrates a perspective view of the compound gears 233 and 234 in the first direction, and 1203 illustrates a perspective view of the compound gears 233 and 234 in the second direction. 1205 illustrates a state of the compound gears 233 and 234 viewed from the z axis direction, and 1207 illustrates a state of the compound gears 233 and 234 viewed from the −x axis direction.

Referring to FIGS. 1 to 12, as described above in FIGS. 3 and 4, the first rotary shaft 231 may include the first rotary shaft body 231_1 and the first main gear 231_2. The first main gear 231_2, for example, may be disposed at an edge of the first shaft body 231_1 in the x axis direction, and may be geared with one side of the first compound gear 233. One side of another structure (e.g., one side of the first arm part 221, sides of the cam members 241a, 241b, and 241c, one side of the stopper 235, one side of the center bracket 243a, one side of the shaft bracket 243b, and the first support ring 292_1) of the hinge structure 200 may be inserted onto the first rotary shaft 231_1. The first main gear 231_2 may include gear teeth having a circular surface that is larger than a z axis cross-section of the first rotary shaft body 231_1 and disposed in the z axis direction. A specific gear tooth of the first main gear 231_2 may be geared with the first gear portion 233_1 of the first compound gear 233. At least some of the main gears 231_2 and 232_2 and the compound gears 233 and 234 may be formed of the same material.

The second rotary shaft 232 may include the second rotary shaft body 232_1 and the second main gear 232_2. The second main gear 232_2, for example, may be disposed at a distal edge of the second shaft body 232_1 in the x axis direction, and may be geared with one side of the second compound gear 234. One side of another structure (e.g., one side of the first arm part 222, sides of the cam members 241a, 241b, and 241c, an opposite side of the stopper 235, an opposite side of the center bracket 243a, an opposite side of the shaft bracket 243b, and the second support ring 292_1) of the hinge structure 200 may be inserted onto the second rotary shaft 232_1. The second rotary shaft body 232_1 may be spaced apart from the first rotary shaft body 231_1 by a specific interval. The second rotary shaft body 232_1 may be disposed side by side (or in parallel to) the first rotary shaft body 231_1 with respect to the −x axis or x axis direction. The second main gear 232_2 may include gear teeth having a circular surface that is larger than a z axis cross-section of the second rotary shaft body 232_1 and disposed in the z axis direction. A specific gear tooth of the second main gear 232_2 may be geared with the third gear portion 234_1 of the second compound gear 234. A shape and a size of the second main gear 232_2 may be the same as or similar to a shape and a size of the first main gear 231_2.

The first compound gear 233 may include a first gear body 233a_1, the first gear portion 233_1, the second gear portion 233_2, a first central boss 233a_2, and a first identification structure 233a_3. According to various other embodiments, at least one of the first central boss 233a_2 and the first identification structure 233a_3 may be omitted.

The length (e.g., a length between the z axis and the y axis) of the first gear body 233a_1 in one direction may be larger than a length (a length between the z axis and the y axis) thereof in an opposite direction. The first gear body 233a_1 may have a specific width or thickness in the x axis (or −x axis) direction, and may be disposed to surround at least a portion of the center point (e.g., the center point R0 of FIG. 9) of the first central boss 233a_2. At least portions of the first gear portion 233_1 and the second gear portion 233_2 may be disposed at opposite edges of the first gear body 233a_1 in one direction (e.g., a diagonal direction from the z axis to they axis).

The first gear portion 233_1 may have a plurality of gear teeth at an edge of the first gear body 233a_1 in a diagonal direction between the z axis and the y axis. The first gear portion 233_1 may include only a portion of the circular gear structure with respect to the center point of the first central boss 233a_2. According to an embodiment, the first gear portion 233_1 may include only gear teeth disposed within an angle range between the z axis and the y axis. According to an embodiment, the first gear portion 233_1 may include a half (or a quarter) or less of the circular gear structure with respect to the center point of the first central boss 233a_2.

In another embodiment, the first gear portion 233_1 may include, among the gear teeth disposed in the circular gear structure with respect to the center point of the first central boss 233a_2, only gear teeth disposed within a range of 90 degrees. The first gear portion 233_1 may be rotated in the counterclockwise direction while the first main gear 231_2 is rotated in the clockwise direction, and may be rotated in the clockwise direction while the first main gear 231_2 is rotated in the counterclockwise direction. The size of the gear teeth of the first gear portion 233_1 may be the same as or similar to the size of gear teeth of the first main gear 231_2. According to an embodiment, a disposition interval of the gear teeth of the first gear portion 233_1 may be the same as or similar to a disposition interval of gear teeth of the first main gear 231_2.

The second gear portion 233_2 may be disposed to be spaced apart from the first gear portion 133_1 and may include only a portion of the circular gear structure with respect to the center point of the first central boss 233a_2. According to an embodiment, the second gear portion 233_2 may include only gear teeth disposed within an angle range between the −y axis and the z axis in the counterclockwise direction. According to certain embodiments, the second gear portion 233_2 may include three fourth or less of the circular gear structure with respect to the center point of the first central boss 233a_2. Furthermore, the second gear portion 233_2 may include, among the gear teeth disposed in the circular gear structure with respect to the center point of the first central boss 233a_2, only gear teeth disposed within a range of 270 degrees. The second gear portion 233_2 may be rotated in the counterclockwise direction while the first main gear 231_2 is rotated in the clockwise direction, and may be rotated in the clockwise direction while the first main gear 231_2 is rotated in the counterclockwise direction. The second gear portion 233_2 may be disposed at an edge of the first gear body 233a_1 that is symmetrical to the first gear portion 233_1 with respect to a diagonal line (e.g., a diagonal line between the z axis and the y axis) that crosses the first central boss 233a_2. According to another embodiment, the second gear portion 233_2 may be disposed to surround another portion of the first central boss 233a_2. The second gear portion 233_2 may be geared with the fourth gear portion 234_2 of the second compound gear 234. The distance from the first center point (or the center point of the first central boss 233a_2) to a tip end of a gear tooth at the second gear portion 233_2 may be shorter than a distance from the first center point (or the center point of the first central boss 233a_2) to a tip end of a gear tooth at the first gear portion 233_1. According to an embodiment, the size of the gear teeth of the second gear portion 233_2 may be the same as or similar to the size of gear teeth of the first gear portion 233_1 (or the first main gear 231_2). According to an embodiment, the disposition interval of the gear teeth of the second gear portion 233_2 may be the same as or similar to a disposition interval of gear teeth of the first gear portion 233_1 (or the first main gear 231_2).

The first central boss 233a_2 may be disposed between a specific location (e.g., the first gear portion 233_1) of the first gear body 233a_1 and the second gear portion 233_2, and may protrude from one surface (e.g., a front surface or a rear surface) of the first gear body 233a_1 by a specific height in the −x axis and x axis directions. At least a portion of the first central boss 233a_2 may be held in or fixed to another structure (e.g., the fixing bracket 213) of the hinge structure 200. The first central boss 233a_2 may connect the front and rear surfaces of the first gear body 233a_1.

The first identification structure 233a_3 may include a structure for distinguishing between the first compound gear 233 and the second compound gear 234. The sizes and shapes of the first main gear 231_2 and the second main gear 232_2 may be the same, but in the disposition process, may have different gear tooth disposition states on opposite sides with respect to the z axis. Accordingly, locations of the first compound gear 233 geared with the first main gear 231_2 and the second main gear 232_2 geared with the second main gear 232_2 are different, and thus, gear connection locations of the first compound gear 233 and the second compound gear 234 may not be symmetrical to each other with respect to the z axis direction. Accordingly, it is necessary to divide the first compound gear 233 and the second compound gear 234 with respect to the leftward and rightward direction according to disposition thereof, and in correspondence, the first identification structure 233a_3 may be formed on one side of the first compound gear 233. For example, the first identification structure 233a_3 may include at least one recess formed at at least a portion of the front surface or the rear surface of the first gear body 233a_1. According to an embodiment, the first identification structure 233a_3 may include an engraved or embossed symbol or letter on the front surface or the rear surface of the first gear body 233a_1.

The second compound gear 234 may include the second gear body 234a_1, the third gear portion 234_1, the fourth gear portion 234_2, a second central boss 234a_2, and a second identification structure 234a_3. According to certain embodiments, at least one of the second central boss 234a_2 and the second identification structure 234a_3 may be omitted.

The second gear body 234a_1 may have a specific width and a specific thickness, the length of the second gear body 234a_1 in a diagonal direction between the −y axis and the z axis may be larger than a length thereof in a diagonal direction between the y axis and the z axis, and the second gear body 234a_1 may be disposed to surround at least a portion of the center point (e.g., the center point that is the same as or similar to the center point R0 of FIG. 9) of the second central boss 234a_2. At least portions of the third gear portion 234_1 and the fourth gear portion 234_2 may be disposed at opposite edges of the second gear body 234a_1 in one direction (e.g., a diagonal direction from the z axis to the y axis).

The third gear portion 234_1 may have a plurality of gear teeth at an edge of the second gear body 234a_1 in a diagonal direction between the z axis and the −y axis. The third gear portion 234_1 may include only a portion of the circular gear structure, a radius of which is a distance from the center point to a gear tooth of the second central boss 234a_2. According to an embodiment, the third gear portion 234_1 may include gear teeth disposed in an angle range between the z axis and the −y axis (or in an angle range corresponding to a second quadrant when an area thereof is divided into four quadrants with respect to the zy coordinate axis, and a quadrant between the −y axis and the z axis is defined as a first quadrant, a quadrant between the z axis and the y axis is defined as a second quadrant, a quadrant between the y axis and the −z axis is defined as a third quadrant, and a quadrant between the −y axis and the −z axis is defined as a fourth quadrant). According to an embodiment, the third gear portion 234_1 may include a half (or a quarter) or less of the circular gear structure with respect to the center point of the second central boss 234a_2. In another embodiment, the third gear portion 234_1 may include, among the gear teeth disposed continuously in the circular gear structure with respect to the center point of the second central boss 234a_2, only gear teeth disposed within a range of 90 degrees. The third gear portion 234_1 may be rotated in the clockwise direction while the second main gear 232_2 is rotated in the counterclockwise direction, and may be rotated in the counterclockwise direction while the second main gear 232_2 is rotated in the clockwise direction. The above-described third gear portion may have a shape that is the same as or similar to that of the above-described first gear portion 233_1. According to an embodiment, the size of the gear teeth of the third gear portion 234_1 may be the same as or similar to the size of gear teeth of the second gear portion 232_2 (or the fourth gear portion 234_2). According to an embodiment, a disposition interval of the gear teeth of the third gear portion 234_1 may be the same as or similar to a disposition interval of gear teeth of the second gear portion 232_2 (or the fourth gear portion 234_2).

The fourth gear portion 234_2 may be disposed to be spaced apart from the third gear portion 234_1 and may include only a portion of the circular gear structure with respect to the center point of the second central boss 234a_2. According to an embodiment, the fourth gear portion 234_2 may include only gear teeth disposed within an angle range between the z axis and the −y axis in the clockwise direction. According to certain embodiments, the fourth gear portion 234_2 may include three fourth or less of the circular gear structure, a radius of which is a distance from the center point of the second central boss 234a_2 to a tip end of a gear tooth.

Furthermore, the fourth gear portion 234_2 may include, among the gear teeth disposed in the circular gear structure with respect to the center point of the second central boss 234a_2, only gear teeth (or gear teeth disposed continuously in an angle range that is smaller than 270 degrees) disposed within a range of 270 degrees. The fourth gear portion 234_2 may be rotated in the clockwise direction while the second main gear 232_2 is rotated in the counterclockwise direction, and may be rotated in the counterclockwise direction while the second main gear 232_2 is rotated in the clockwise direction. A distance from the second center point (or the center point of the second central boss 234a_2) to a tip end of a gear tooth at the fourth gear portion 234_2 may be shorter than a distance from the second center point (or the center point of the second central boss 234a_2) to a tip end of a gear tooth at the third gear portion 234_1. The fourth gear portion 234_2 may be disposed at an edge of the second gear body 234a_1 that is symmetrical to the third gear portion 234_1 with respect to a diagonal line (e.g., a diagonal line between the z axis and the −y axis) that crosses the second central boss 234a_2. According to another embodiment, the fourth gear portion 234_2 may be disposed to surround another portion of the second central boss 234a_2. The fourth gear portion 234_2 may be geared with the second gear portion 233_2 of the first compound gear 233.

The second central boss 234a_2 may be disposed between a specific location (e.g., the third gear portion 234_1) of the second gear body 234a_1 and the fourth gear portion 234_2, and may protrude from one surface (e.g., a front surface or a rear surface) of the second gear body 234a_1 by a specific height in the −x axis and x axis directions. At least a portion of the second central boss 234a_2 may be held in or fixed to another structure (e.g., the fixing bracket 213) of the hinge structure 200. The second central boss 234a_2 may connect the front and rear surfaces of the second gear body 234a_1. The second central boss 234a_2 may have a structure and a size that are the same as or similar to those of the first central boss 233a_2.

The second identification structure 234a_3 may include a structure for distinguishing between the first compound gear 233 and the second compound gear 234. The sizes and shapes of the first main gear 231_2 and the second main gear 232_2 may be the same, but in the disposition process, may have different gear tooth disposition states on opposite sides with respect to the z axis. Accordingly, locations of the first compound gear 233 geared with the first main gear 231_2 and the second main gear 232_2 geared with the second main gear 232_2 are different, and thus, gear connection locations of the first compound gear 233 and the second compound gear 234 may not be symmetrical to each other with respect to the z axis direction. Accordingly, it is necessary to divide the first compound gear 233 and the second compound gear 234 with respect to the leftward and rightward direction according to disposition thereof, and in correspondence, the second identification structure 234a_3 may be formed on one side of the second compound gear 234. For example, the second identification structure 234a_3 may include at least one recess formed at at least a portion of the front surface or the rear surface of the second gear body 234a1. According to an embodiment, the second identification structure 234a_3 may include an engraved or embossed symbol or letter on the front surface or the rear surface of the second gear body 234a_1.

According to an embodiment, with respect to an upper side (e.g., the z axis direction or the direction of the display 160), the gear center point (or the center point of the first central boss 233a_2) of the first gear portion 233_1 may be disposed below the gear center point (or an x axis center point of the first rotary shaft) of the first main gear 231_2. According to an embodiment, with respect to the upper side (e.g., the z axis direction or the direction of the display 160), the gear center point (or the center point of the second central boss 234a_2) of the second gear portion 234_1 may be disposed below the gear center point (or an x axis center point of the first rotary shaft) of the second main gear 232_2. The gear center point of the first gear portion 233_1 and the gear center point of the second gear portion 234_1 may be located on the same line with respect to the y axis, and the center point of the first main gear 231_2 and the center point of the second main gear 232_2 may be located on the same line with respect to the y axis.

Figure 13:
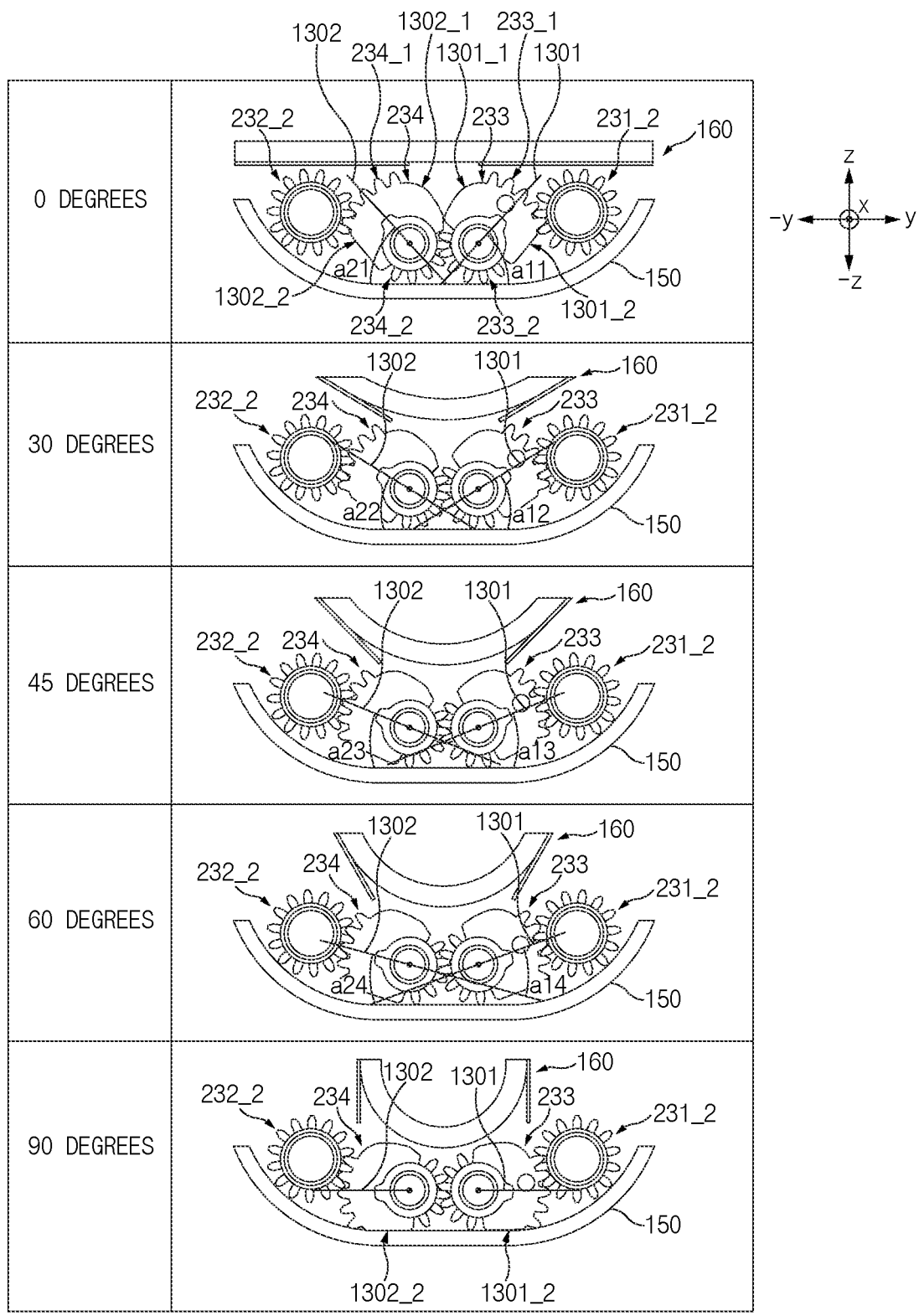
FIG. 13 is a view illustrating main gears and compound gears according to various disposition states of an electronic device according to an embodiment.

FIG. 13 is a view illustrating main gears and compound gears according to various disposition states of an electronic device according to an embodiment.

Referring to FIGS. 1 to 13, in the unfolded state of the display 160 of the electronic device 100 (e.g., a state in which the first housing 110 and the second housing 120 of the electronic device 100 is 0 degrees (or 180 degrees), the first compound gear 233 may be formed such that a zy axis diagonal length of the hinge structure located inside the hinge housing 150 (the distance between an end of an edge of one side of the structure in the zy axis direction and an end of an edge of an opposite side thereof in the (−z)(−y) axis direction via the center point of the first central boss 233a_2) is larger than a −zy diagonal length thereof (e.g., a diagonal distance perpendicular to the zy axis diagonal between opposite edges of the first gear body 233a_1). The first compound gear 233 may be disposed such that a first diagonal line center line 1301 is inclined with respect to the z axis in the y axis direction by a first angle a11. Furthermore, the first diagonal line center line 1301 of the first compound gear 233 may be disposed to be inclined with respect to a bottom surface of the hinge housing 150 in the clockwise direction by the first angle a11. Similarly, the second compound gear 234 may be disposed such that the second diagonal line center line 1302 disposed in the −yz axis via the center point of the second central boss 234a_2 is inclined with respect to the z axis in the −y axis direction by a second angle a21. Furthermore, the second diagonal line center line 1302 of the second compound gear 234 may be disposed to be inclined with respect to a bottom surface of the hinge housing 150 in the clockwise direction by the second angle a21. The first angle a11 and the second angle a21 may be the same or similar angles. According to an embodiment, with respect to the center line 1301 of the illustrated drawings, a left edge 1301_1 and a right edge 1301_2 of the first compound gear 233 may have different shapes. Similarly, with respect to the illustrated second diagonal line center line 1302, a right edge 1301_1 and a left edge 1302_2 of the second compound gear 234 may have different shapes. According to an embodiment, the left edge 1301_1 of the first compound gear 233 and the right edge 1302_1 of the second compound gear 234 may have shapes and sizes that are the same or similar, and the right edge 1301_2 of the first compound gear 233 and the left edge 1302_2 of the second compound gear 234 may have shapes and sizes that are the same or similar. According to an embodiment, the left edge 1301_1 of the first compound gear 233 and the right edge 1302_1 of the second compound gear 234 may at least partially include a curved portion, and the right edge 1301_2 of the first compound gear 233 and the left edge 1302_2 of the second compound gear 234 may at least partially include a flat surface.

According to (during or in correspondence to) application of an external pressure, the first housing 110 or the second housing 120 connected to the hinge structure 200 may be rotated about the xy axis plane in the z axis direction in a clockwise or counterclockwise direction by 30 degrees. Correspondingly, the first diagonal line center line 1301 of the first compound gear 233 may be disposed to be inclined with respect to a bottom surface of the hinge housing 150 in the clockwise direction by a third angle a12, and the second diagonal line center line 1302 of the second compound gear 23 may be disposed to be inclined with respect to the bottom surface of the hinge housing 150 in the counterclockwise direction by a fourth angle a22. The third angle a12 is an angle that is smaller than the first angle a11, and the fourth angle a22 is an angle that is smaller than the second angle a21.

According to (during or in correspondence to) additional application of an external pressure, the first housing 110 or the second housing 120 connected to the hinge structure 200 may be rotated about the xy axis plane in the z axis direction in a clockwise or counterclockwise direction by 45 degrees or 60 degrees. In correspondence, the first diagonal line center line 1301 of the first compound gear 233 may be disposed to be inclined with respect to a bottom surface of the hinge housing 150 in the clockwise direction by a fifth angle a13 or a seventh angle a14, and the second diagonal line center line 1302 of the second compound gear 23 may be disposed to be inclined with respect to the bottom surface of the hinge housing 150 in the counterclockwise direction by a sixth angle a23 or an eighth angle a24. The fifth angle a13 is an angle that is smaller than the third angle a13, and the seventh angle a14 is an angle that is smaller than the fifth angle a13. The sixth angle a23 is an angle that is smaller than the fourth angle a22, and the eighth angle a24 is an angle that is smaller than the sixth angle a23

According to (during or in correspondence to) additional application of an external pressure, the first housing 110 or the second housing 120 connected to the hinge structure 200 may be rotated about the xy axis plane in the z axis direction in a clockwise or counterclockwise direction by 90 degrees (or an angle that is larger than 90 degrees). In this process, an edge of one side of the first housing 110 and an edge of one side of the second housing 120 may face or contact each other. According to an embodiment, the first housing 110 and the second housing 120 may be disposed in parallel or substantially parallel (sufficiently parallel to close the electronic device) to each other in the z axis direction. In correspondence to the state, the first diagonal line center line 1301 of the first compound gear 233 may be disposed in parallel to the second diagonal line center line 1302 of the second compound gear 234. According to various embodiments, the first diagonal line center line 1301 of the first compound gear 233 and the second diagonal line center line 1302 of the second compound gear 234 may be disposed in parallel to the flat bottom surface of the hinge housing 150. According to an embodiment, the right edge 1301_2 of the first compound gear 233 and the left edge 1302_2 of the second compound gear 234 may be disposed in parallel to the flat bottom surface of the hinge housing 150.

Figure 14:
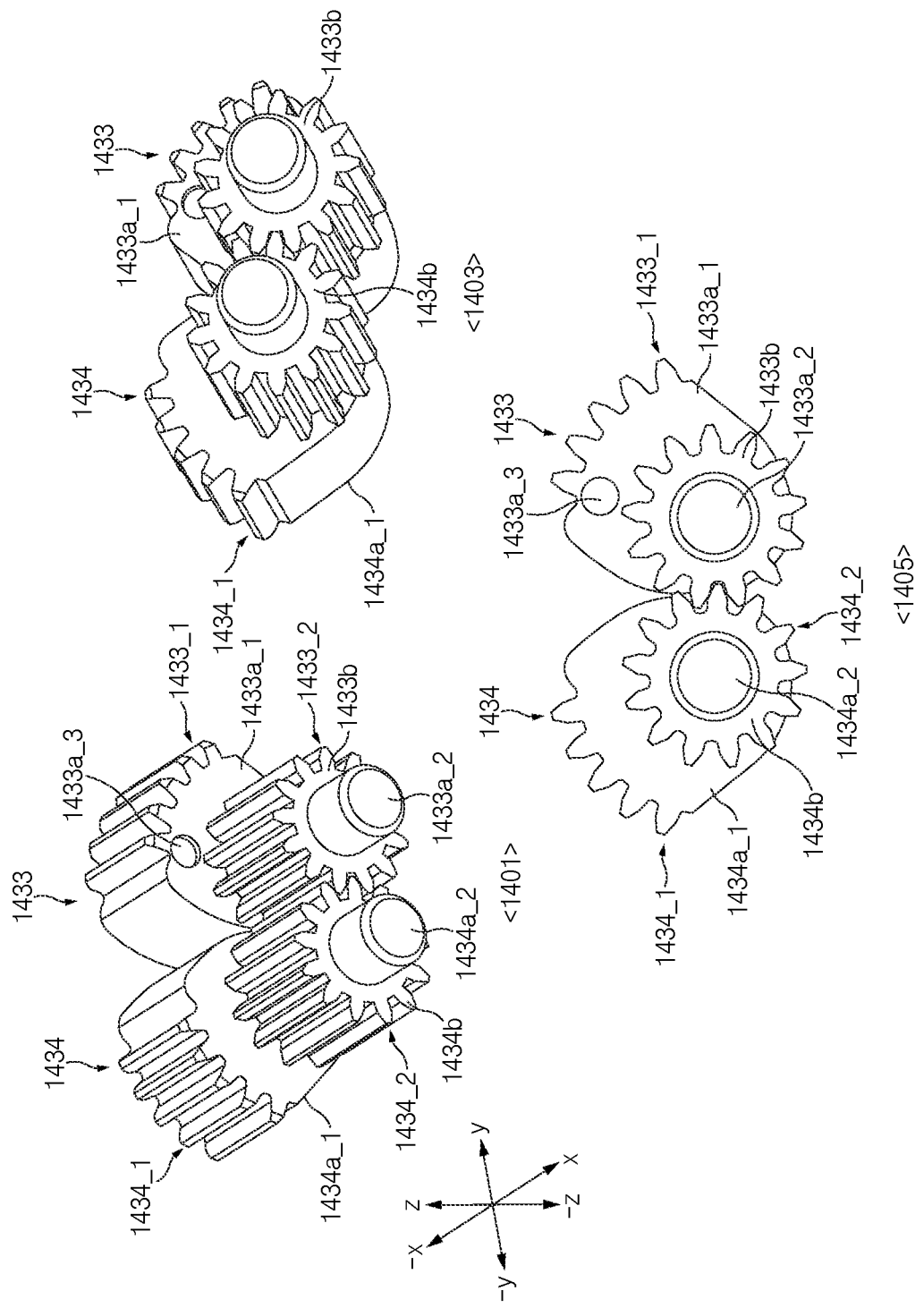
FIG. 14 is a view illustrating an example of a front surface of compound gears according to another embodiment of the disclosure.
Figure 15:
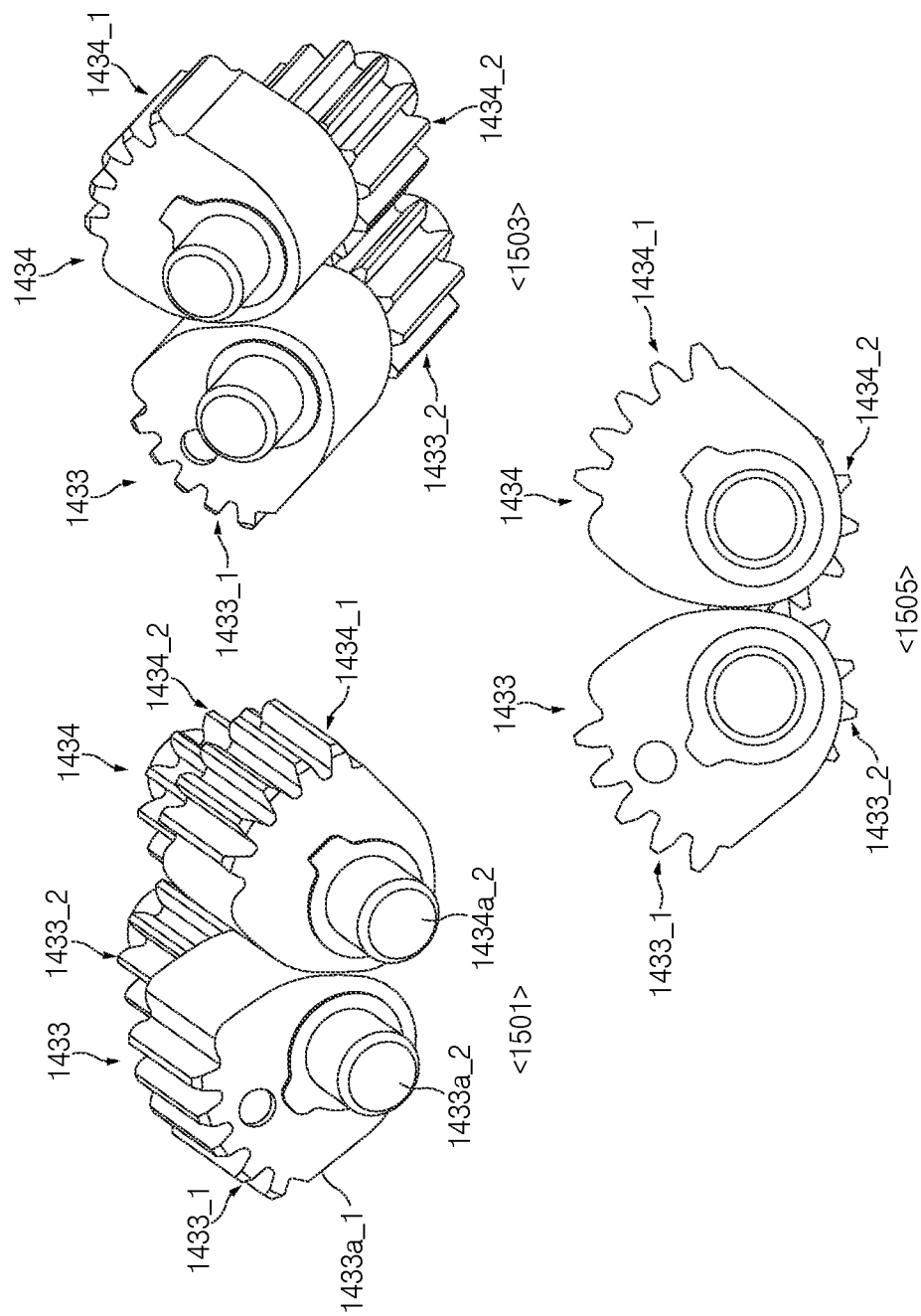
FIG. 15 is a view illustrating an example of a rear surface of compound gears according to another embodiment of the disclosure.

FIG. 14 is a view illustrating an example of a front surface of compound gears according to another embodiment of the disclosure. FIG. 15 is a view illustrating an example of a rear surface of compound gears according to another embodiment of the disclosure.

Referring to FIGS. 1 to 15, the hinge structure may include a first compound gear 1433 and a second compound gear 1434. The first compound gear 1433 and the second compound gear 1434 may be formed of the same material. The first compound gear 1433 may include a first gear body 1433a_1, a first gear portion 1433_1, a third gear body 1433b, a second gear portion 1433_2, and a first central boss 1433a_2. At least some of the components of the first compound gear 1433 may be made of the same material, or may be made of the same or similar materials having similar strengths.

The length of the first gear body 1433a_1 in one direction may be larger than a length thereof in another direction (a direction that is perpendicular to the one direction), and may have a specific width or thickness in the x axis direction. The first gear portion 1433_1 may be disposed at an edge of the first gear body 1433a_1 in the z axis to the y axis direction. According to an embodiment, an identification structure (e.g., a groove, a hole or a boss) for distinguishing between the first compound gear 1433 and the second compound gear 1434 may be further disposed in the first gear body 1433a_1. A portion of another corner of the first gear body 1433a_1, at which the first gear portion 1433_1 is not formed, may be disposed to be adjacent to another corner of the third gear body 1433b, at which the third gear portion 1434_1 is not formed.

The first gear portion 1433_1 may include a structure, in which gear teeth are formed only at a portion of an edge of the first gear body 1433a_1 in the z axis to the y axis direction. The first gear portion 1433_1 may be geared with the first main gear 231_2. The first gear portion 1433_1 may be disposed to be symmetrical to the third gear portion 1343_1 of the second compound gear 1434 with respect to the z axis. The structure including the first gear body 1433a_1 and the first gear portion 1433_1 may substantially have a water drop shape or a foot shape.

The third gear body 1433b may have a circular band shape that surrounds at least a portion of a circumference of the first central boss 1433*a*_2. The third gear body 1433*b* may be disposed in a structure that is stacked on the first gear body 1433*a*_1. The second gear portion 1433_2 may be disposed on an outside of the third gear body 1433*b*.

The second gear portion 1433_2 may protrude from a front surface (e.g., one surface in the x axis direction) of the first gear body 1433*a*_1 in the x axis direction. The second gear portion 1433_2 may have a circular band shape on an outside of the third gear body 1433*b*. A first central boss 1433*a*2 may be disposed at a central portion of the second gear portion 1433_2. The second gear portion 1433_2, for example, may include a circular gear structure that surrounds a circumference of the first central boss 1433*a*2 or a circumference of the third gear body 1433*b*. The second gear portion 1433_2 may be geared with the fourth gear portion 1434_2 of the second compound gear 1434. The width of the first gear body 1433*a*_1 and the width of the second gear portion 1433_2 may be the same or similar. According to another embodiments, the width of the first gear body 1433*a*_1 and the width of the second gear portion 1433_2 may be different. The above-described second gear portion 1433_2 may be disposed in a structure that is stacked on the first gear portion 1433_1.

The first central boss 1433*a*2 may be commonly disposed on one side of the first gear body 1433*a*_1 and one side of the third gear body 1433*b*. The center point of the first central boss 1433*a*_2 may be the center point of the first gear portion 1433_1 and the center point of the second gear portion 1433_2. The center point of the first gear portion 1433_1 and the center of the second gear portion 1433_2 may be located at a center of the first central boss 1433*a*_2, and may be spaced apart from each other on the x axis line. Because the above-described first compound gear 1433 is formed in a structure, in which the first gear portion 1433_1 and the second gear portion 1433_2 are stacked, the size of the first compound gear 1433 in the z axis direction may be shorter than that of the gear structure described above in FIGS. 9 to 13.

The second compound gear 1434 may include a second gear body 1434*a*_1, a third gear portion 1434_1, a fourth gear body 1434*b*, a fourth gear portion 1434_2, and a second central boss 1434*a*_2. At least some of the components of the second compound gear 1434 may be made of the same material, or may be made of the same or similar materials having similar strengths.

The second gear body 1434*a*_1 may have a shape and a size that are the same as or similar to those of the first gear body 1433*a*_1. For example, the length of the second gear body 1434*a*_1 in one direction may be larger than the length thereof in another direction (a direction that is perpendicular to the one direction), and may have a specific width or thickness in the x axis direction. The second gear portion 1434_1 may be disposed at an edge of the second gear body 1434*a*_1 in the z axis to the y axis direction. According to an embodiment, an identification structure (e.g., a groove, a hole or a boss) for distinguishing between the first compound gear 1433 and the second compound gear 1434 may be further disposed in the second gear body 1434*a*_1. A portion of another corner of the second gear body 1434*a*_1, at which the third gear portion 1433_1 is not formed, may be disposed to be adjacent to another corner of the first gear body 1433*a*_1, at which the first gear portion 1433_1 is not formed.

The third gear portion 1434_1 may have a shape that is the same as or similar to that of the first gear portion 1433_1. A disposition direction of the third gear portion 1434_1 may be different from that of the first gear portion 1433_1. For example, the third gear portion 1434_1 may include a structure, in which gear teeth are formed only at a portion of an edge of the second gear body 1434*a*_1 in the z axis to the −y axis direction. The third gear portion 1434_1 may be geared with the second main gear 232_2. The third gear portion 1434_1 may be disposed to be symmetrical to the first gear portion 1433_1 of the first compound gear 1433 with respect to the z axis. The structure including the second gear body 1434*a*_1 and the third gear portion 1434_1 may substantially have a water drop shape or a foot shape.

The fourth gear body 1434*b* may have a circular band shape that surrounds at least a portion of a circumference of the second central boss 1434*a*2. The fourth gear body 1434*b* may be disposed in a structure that is stacked on the second gear body 1434*a*_1. The fourth gear portion 1434_2 may be disposed on an outside of the fourth gear body 1434*b*. The fourth gear body 1434*b* may have a size and a structure that are the same as or similar to those of the third gear body 1433*b*. The fourth gear body 1434*b* may have a thickness that is the same as or similar to that of the second gear body 1434*a*_1.

The fourth gear portion 1434_2 may have a structure and a disposition state that are the same as or similar to those of the second gear portion 1433_2. For example, the fourth gear portion 1434_2 may protrude from a front surface (e.g., one surface in the x axis direction) of the fourth gear body 1434*b* in the x axis direction. A second central boss 1434*a*_2 may be disposed at a central portion of the fourth gear portion 1434_2. The fourth gear portion 1434_2, for example, may include a circular gear structure that surrounds a circumference of the second central boss 1434*a*_2. The fourth gear portion 1434_2 may be geared with the second gear portion 1433_2 of the first compound gear 1433. A width of the fourth gear body 1434*b*_1 and a width of the fourth gear portion 1434_2 may be the same or similar. According to an embodiment, the width of the fourth gear body 1434*b* and the width of the fourth gear portion 1434_2 may be different. The above-described fourth gear portion 1434_2 may be disposed in a structure that is stacked on the third gear portion 1434_1.

The second central boss 1434*a*_2 may have a structure and a size that are the same as or similar to those of the first central boss 1433*a*_2. The second central boss 1434*a*_2 may be spaced apart from the first central boss 1433*a*_2 with respect to the x axis, and may be disposed to side by side with (in parallel to) the first central boss 1433*a*_2. The central boss 1434*a*2 may be commonly disposed on one side of the third gear body 1433*b* and one side of the fourth gear body 1434*b*. The center point of the second central boss 1434*a*_2 may be the center point of the third gear portion 1434_1 and the center point of the fourth gear portion 1434_2. The center point of the third gear portion 1434_1 and the center of the fourth gear portion 1434_2 may be located at a center of the second central boss 1434*a*_2, and may be spaced apart from each other on the x axis line. Because the above-described second compound gear 1434 is formed in a structure, in which the third gear portion 1434_1 and the fourth gear portion 1434_2 are stacked, a size of the first compound gear 1433 in the z axis direction may be shorter than that of the gear structure described above in FIGS. 9 to 13.

Figure 16:
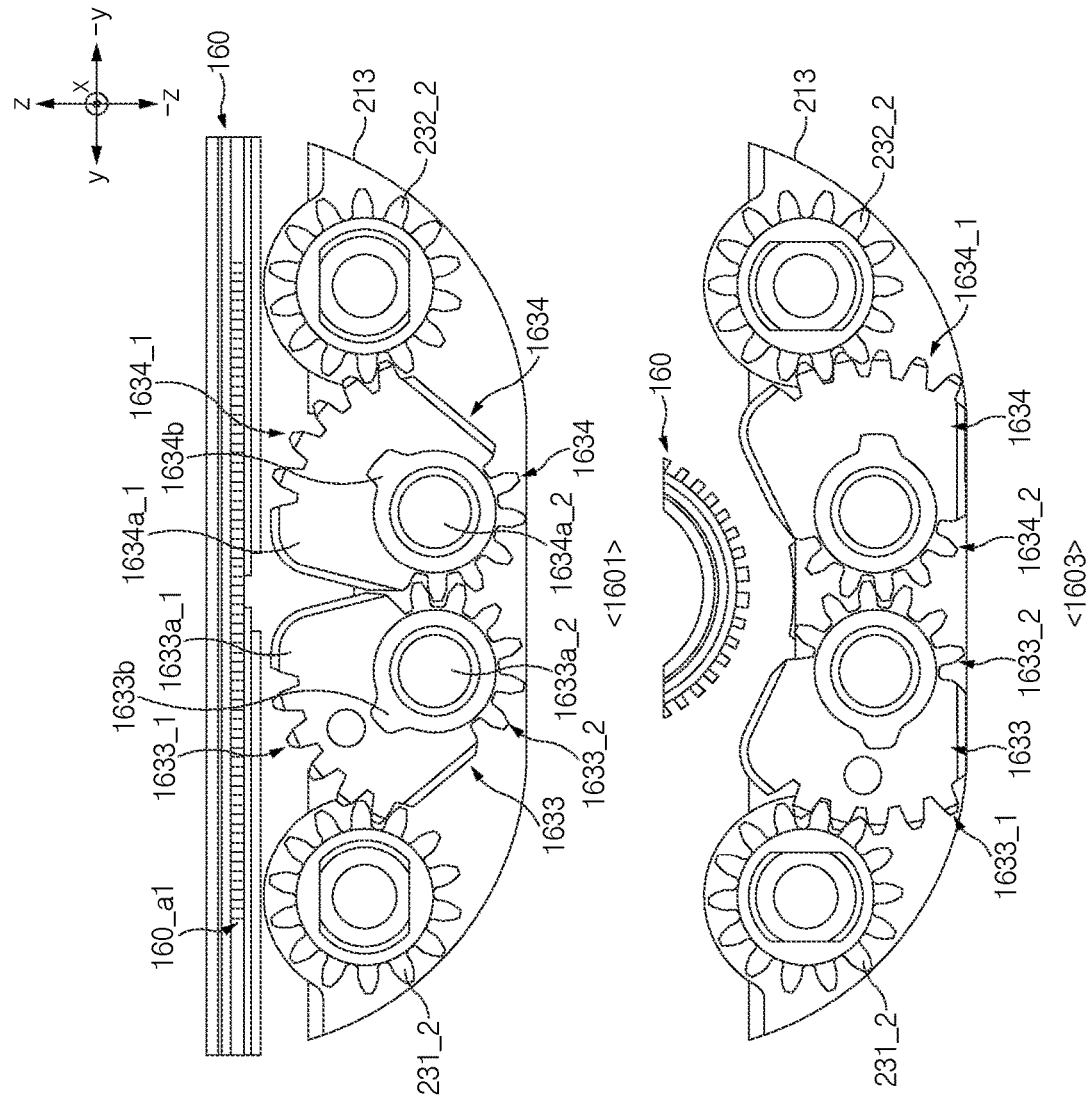
FIG. 16 is a view illustrating some examples of configurations of an electronic device, to which a compound gear is applied, according to another embodiment of the disclosure.

FIG. 16 is a view illustrating some examples of configurations of an electronic device, to which a compound gear is applied, according to another embodiment of the disclosure.

Referring to FIGS. 1 to 16, at least a portion of the electronic device 100 includes the display 160, the fixing bracket 213, and the hinge structure, and the hinge structure may include at least some configurations of the hinge structure held on (or fixed to) one side of the fixing bracket 213, for example, a first main gear 231_2, a second main gear 232_2, a first compound gear 1633, and a second compound gear 1634.

The display 160 may be disposed on an upper side (e.g., the z axis direction) of the fixing bracket 213, on which at least a portion of the hinge structure is mounted. The display 160, for example, may include a pixel layer (e.g., an OLED layer), in which at least one pixel for outputting an image is disposed, a protection layer (e.g., a polyimide layer or a transparent protection layer) positioned on the pixel layer, and at least one additional layer (e.g., at least one of a metal layer and a cushion layer) disposed under the pixel layer. According to an embodiment, the additional layer may include a support layer 160_a1 including a lattice pattern at least formed at a folded portion of the display 160. At least a portion of the support layer 160_a1 may be formed of a metal member. An additional metal panel layer that supports the display 160 may be disposed under the support layer 160_a1.

At least a portion of the first housing 110 and the second housing 120 may be seated on and coupled to the fixing bracket 213, and the fixing bracket 213 may be fixed to one side of the hinge housing 150. The rotary shafts of the hinge structure, in which the main gears 231_2 and 232_2 are formed, and the compound gears 1633 and 1634 may be held on or fixed to a side of the fixing bracket 213.

One side of the first main gear 231_2 may be fixed to the fixing bracket 213, and the first main gear 231_2 may be geared with the first compound gear 1633. The first main gear 231_2, for example, may be disposed at an edge of one side of the first rotary shaft.

One side of the second main gear 232_2 may be fixed to the fixing bracket 213, and the second main gear 232_2 may be geared with the second compound gear 1634. The second main gear 232_2, for example, may be disposed at an edge of one side of the second rotary shaft. The second main gear 232_2 may be disposed to be spaced apart from the first main gear 231_2 by a specific interval.

The first compound gear 1633 may include a first gear body 1633a_1, a first gear portion 1633_1, a third gear body 1633b, a second gear portion 1633_2, and a first central boss 1633a_2. The configurations may include configurations that are the same as or similar to the configurations of the first compound gear 1633 described above in FIGS. 14 and 15, except for the second gear portion 1633_2. Gear teeth may be partially formed in the second gear portion 1633_2, unlike the second portion described in FIGS. 14 and 15. For example, the second gear portion 1633_2 may include gear teeth disposed only in a range of right 180 degrees with respect to the z axis in state 1603 of the illustrated drawings. Furthermore, the second gear portion 1633_2 may include a structure, in which gear teeth are disposed only a partial arc with reference to the circular gear structure. The second gear portion 1633_2 may be geared with the second compound gear 1634 and the fourth gear portion 1634_2.

The second compound gear 1634 may include a second gear body 1634a_1, a third gear portion 1634_1, a fourth gear body 1634b, a fourth gear portion 1634_2, and a second central boss 1634a_2. The configurations shown may be the same as or similar to the configurations of the second compound gear 1634 described above in FIGS. 14 and 15, except for the fourth gear portion 1634_2. The fourth gear portion 1634_2 may have a shape that is the same as or similar to that of the second gear portion 1633_2 of the above-described first compound gear 1633. For example, gear teeth may be partially formed in the fourth gear portion 1634_2, unlike the second portion described in FIGS. 14 and 15. For example, the second gear portion 1633_2 may include gear teeth disposed only in a range of left 180 degrees with respect to the z axis in state 1603 of the illustrated drawings. Furthermore, the second gear portion 1633_2 may include a structure, in which gear teeth are disposed only a partial arc with reference to the circular gear structure. The second gear portion 1633_2 may be geared with the second compound gear 1634 and the fourth gear portion 1634_2.

In the illustrated drawings, state 1601 may correspond to the unfolded states of the first housing 110 and the second housing 120 of the electronic device 100 or the unfolded state of the display 160. In the unfolded state of the display 160, a counterclockwise edge of the first gear portion 1633_1 having a partial arc shape of the circular structure may be geared with the first main gear 231_2, and a counterclockwise edge of the second gear portion 1633_2 may be geared with a clockwise edge of the fourth gear portion 1634_2 of the second compound gear 1634.

In the illustrated drawings, state 1603 may correspond to the folded states of the first housing 110 and the second housing 120 of the electronic device 100 or the folded state of the display 160. In the folded state of the display 160, a counterclockwise edge of the first gear portion 1633_1 having a partial arc shape of the circular structure may be geared with the first main gear 231_2, and a central portion of the second gear portion 1633_2 may be geared with a central portion of the fourth gear portion 1634_2 of the second compound gear 1634.

Figure 17:
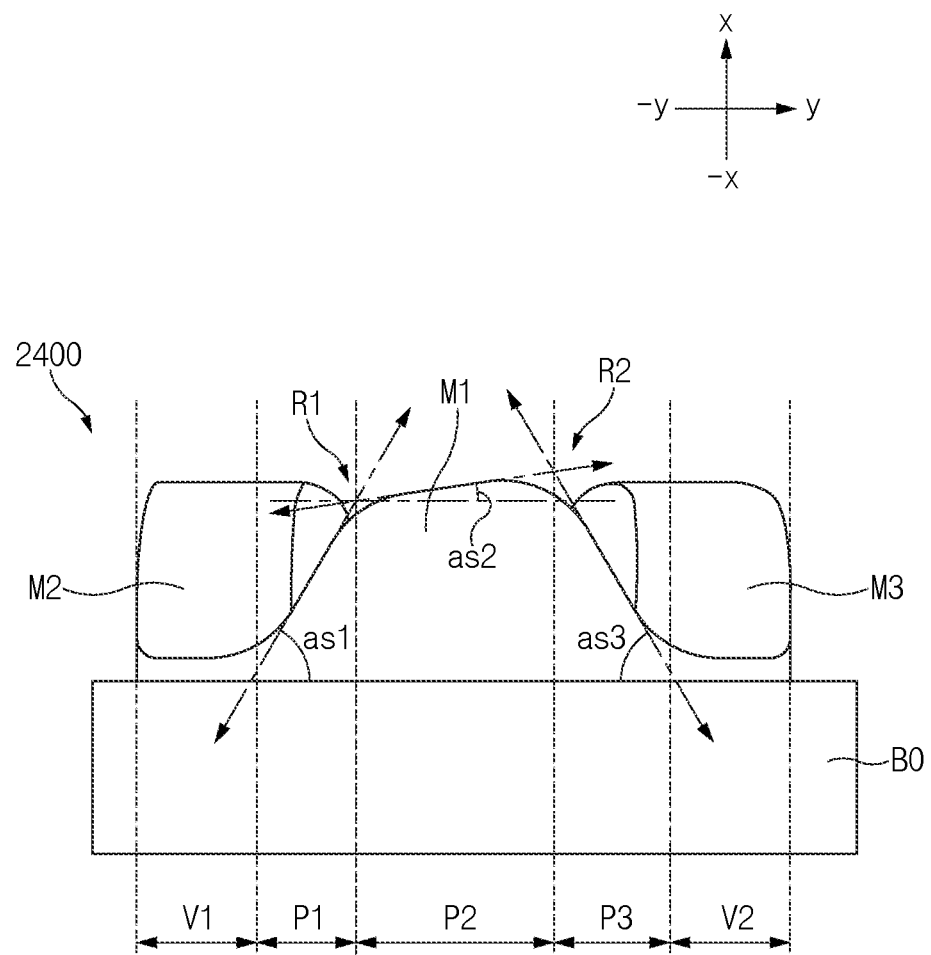
FIG. 17 is a view illustrating another example of a shape of a cam according to an embodiment.
Figure 18:
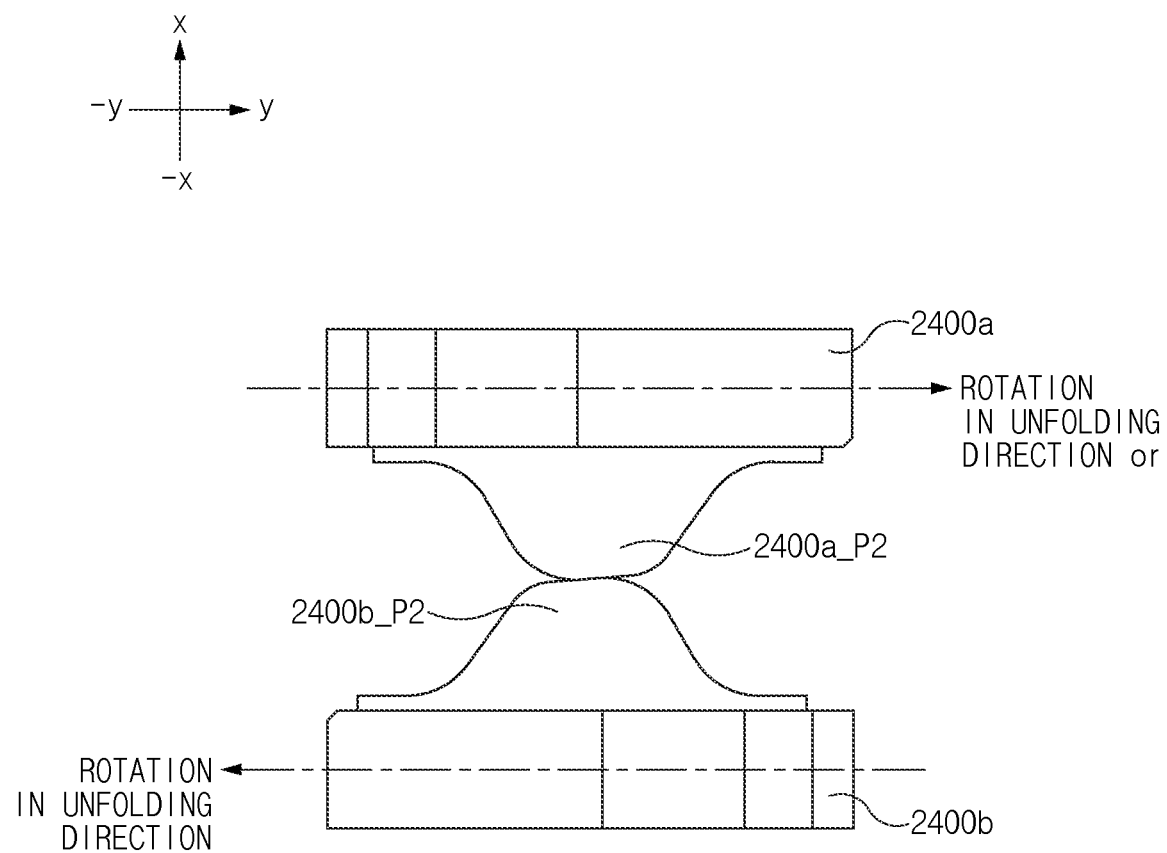
FIG. 18 is a view illustrating an example of a contact state of a cam and some mountains of a cam structure according to an embodiment.

FIG. 17 is a view illustrating another example of shapes of a cam member and a cam structure applied to an electronic device according to an embodiment. FIG. 18 is a view illustrating an example of a contact state of a cam member and some mountains of a cam structure according to an embodiment. A cam 2400a according to an embodiment may be applied to at least one of the cam of the cam member or the cam structure of the arm part described above in FIGS. 2 to 7.

Referring to FIG. 17, the cam 2400a (or the cam structure) according to the embodiment may include a cam support portion BO, a plurality of mountains M1, M2, and M3, and a plurality of valleys V1 and V2. Although the illustrated drawings suggest the cam 2400a including three mountains M1, M2, and M3 and three valleys V1 and V2 (a valley covered by the first mountain M1 is not illustrated), the disclosure is not limited thereto. For example, the cam 2400a may have a structure including two or more cams and mountains. All of the plurality of mountains M1, M2, and M3 may have the same structure. Furthermore, a mountain of at least one of the plurality of mountains M1, M2, and M3 may have formed that are different from those of the other mountains. For example, as illustrated, at least one mountain may have a structure, in which a second part P2 corresponding to the center of the mountain has a specific inclination angle (e.g., an inclination angle that is larger than 0, for example, around about 5 degrees), and at least one of the remaining mountains may have a structure, in which a central portion of the mountain is flat.

According to an embodiment, at least one mountain of the plurality of mountains M1, M2, and M3, for example, the first mountain M2, as illustrated, may include a first part P1 having a first inclination angle as1, a second part P2 having a second inclination angle as2, and a third part P2 having a third inclination angle as3. One side (e.g., a −y axis end) of the first part P1 is connected to one side (e.g., a y axis end)

of the first valley V1, and an opposite side (e.g., a y axis end) of the first part P1 may be connected to one side (e.g., a −y axis end) of the second part P2. The first part P1, for example, may have a ridge line having the first inclination angle as1 with respect to the y axis. The first inclination angle as 1 may include an acute angle that is smaller than 90 degrees from the −y axis to the y axis direction.

One side (e.g., a −y axis end) of the second part P2 is connected to an opposite side (e.g., a y axis end) of the first part P1, and an opposite side (e.g., a y axis end) of the second part P1 may be connected to one side (e.g., a −y axis end) of the third part P3. The second part P2 may be disposed to protrude further than the first part P1 and the third part in the x axis direction. A border area of the first part P1 and the second part P2 may be rounded at a specific curvature R1. The second part P2 may have a second inclination angle as2 with respect to the y axis. The second inclination angle as2 may include an acute angle that is smaller than 90 degrees from the −y axis in the y axis direction, and an absolute angle of the second inclination angle as2 may be smaller than an absolute value of the first inclination angle as1.

One side (e.g., a −y axis end) of the third part P3 may be connected to an opposite side (e.g., a y axis end) of the second part P1, and an opposite side (e.g., a y axis end) of the third part P3 may be connected to one side (e.g., a −y axis end) of the second valley V2. The third part P3 may be formed to have a specific inclination that is inclined from the second part P2 in the y axis direction. A border area of the second part P2 and the third part P3 may be rounded at a specific curvature R2. The second curvature R2 may have a value that is smaller than the first curvature R1 (e.g., the first curvature R1 is smoother than the second curvature R2). The third part P2 may have a third inclination angle as3 with respect to the −y axis. The third inclination angle as3 may include an acute angle that is smaller than 90 degrees from the −y axis in the y axis direction, and an absolute angle of the third inclination angle as3 may be smaller than an absolute value of the second inclination angle as2. According to certain embodiments, an absolute value of the third inclination angle as3 may be the same as or larger than the absolute value of the first inclination angle as1.

Referring to FIG. 18, the cam shape described in FIG. 17 may be applied to the cam of the at least one cam member or a cam structure of the at least one arm part described above in FIGS. 2 to 7. For example, in the illustrated drawings, a protrusion of the cam 2400a may be disposed to protrude in the −x axis direction, and a protrusion of the cam structure 2400b may be disposed to protrude the x axis direction. Furthermore, a convex-concave part of the cam 2400a and a convex-concave part of the cam structure 2400b may be disposed to face each other. At least a portion of the second part 2400a_P2 of the cam 2400a and at least a portion of the second part 2400b_P2 of the cam structure 2400b, as illustrated, may contact each other in a free-stop section (a section, in which the electronic device is held at a specific angle range due to the friction of the cam 2400a and the cam structure 2400b) of the electronic device (e.g., the electronic device 100 of FIG. 2). According to an embodiment, when the electronic device has a free-stop state (e.g., a state, in which the electronic device is stopped while no additional pressure is present at a holding angle of 30 degrees, 45 degrees, 60 degrees, and the like) described in FIG. 13, the display (the display 160 of FIG. 1A) may show a repulsive force for returning to the unfolded state (a state of 0 degrees of FIG. 13).

According to an embodiment, the cam 2400a may be pushed in the y axis direction by a restoring force of the display (e.g., a repulsive force of the display is applied in the counter clockwise direction), and the cam structure 2400b may be pushed in the −y axis direction by a restoring force of the display (e.g., a repulsive force of the display is applied in the clockwise direction). In this process, because the second part 2400a_P2 of the cam 2400a and the second part 2400b_P2 of the cam structure 2400b contact each other while having the above-described second inclination angle as2, the cam 2400a and the cam structure 2400b of the disclosure may restrain pushing in the free-stop state (e.g., maintaining an angle between the first housing (e.g., the first housing 110 of FIG. 1A) and the second housing (e.g., the second housing 120 of FIG. 1A), which may occur regardless of an intention of the user by offsetting at least a portion of the repulsive force (or the restoring force) generated in the unfolding direction of the display. According to an embodiment, as described above with the specific angle (e.g., 30 degrees, 45 degrees, and 60 degrees) of FIG. 13, the electronic device may be in a holding state (or a free-stop state) of a specific angle. In this case, the electronic device, as illustrated, may be disposed such that the cam 2400a and the cam structure 2400b are engaged with each other, and may offset a force, by which the repulsive force or the restoring force is applied in the unfolded state as in the 0 degree state in FIG. 13. Although FIG. 18 exemplifies a structure, in which apex portions of the mountains of both of the cam 2400a and the cam structure 2400b have the second inclination angle as2, the disclosure is not limited thereto. For example, the second part P2 having the second inclination angle as2 may be formed in any one of the cam 2400a or the cam structure 2400b.

Meanwhile, although FIG. 18 is illustrated with respect to a direction, in which the cam 2400a is rotated from the −y axis (or the left side) in the y axis (or rightward) direction, the disclosure is not limited thereto. For example, according to a design layout of the electronic device, a direction, in which the cam 2400a is rotated from the y axis in the −y axis direction, may be a direction, in which the display is operated in the unfolded state, from the folded state.

The various configurations described above in FIGS. 1A to 18 may be mixed and matched. For example, the structure, in which the gear portions described in FIGS. 14 and 15, may be applied together with the structure, in which the gear portions are disposed on the same plane. According to an embodiment, while a first structure, in which the gear portions are disposed on the same plane, is applied to the first hinge structure 200a, a second structure, in which the gear portions are stacked, may be applied to the second hinge structure 200b.

According to an embodiment, an electronic device (or a portable electronic device, a portable communication device, a foldable electronic device, or a foldable electronic device having a communication function) may include a first housing 110 and a second housing 120, a hinge structure 200a and 200b connected to the first housing and the second housing, and a display 160 disposed in the first housing and/or the second housing, the hinge structure 200a may include a first rotary shaft 231 (or a first shaft) rotating about a first axis 11, a second rotary shaft 232 (or a second shaft) rotating about a second axis 12, a first arm part 221 connected to the first rotary shaft, a second arm part 222 connected to the second rotary shaft, a first rotation part 211 connected to the first arm part and rotating about a third axis 13, a second rotation part 212 connected to the second arm part and rotating about a fourth axis 14, a first main gear 231_2 disposed on the first rotary shaft, a second main gear 232_2 disposed on the second rotary shaft, and a first compound gear 233 and a second compound gear 234 disposed between the first main gear and the second main gear, the first compound gear may include a first gear portion 233_1 geared with the first main gear, and of which a distance from a center point to a gear tooth end is a first radius, and a second gear portion 233_2 geared with the second compound gear, and of which a distance from a center point to a gear tooth end is a second radius that is smaller than the first radius, and the second compound gear may include a third gear portion 234_1 geared with the second main gear, and of which a distance from a center point to a gear tooth end is a first radius, and a fourth gear portion 234_2 geared with the second gear portion of the first compound gear, and of which a distance from a center point to a gear tooth end is the second radius.

According to an embodiment, a size of the gear teeth of the first gear portion may be the same as a size of the gear teeth of the second gear portion.

According to an embodiment, a size of the gear teeth of the first gear portion may be the same as a size of the gear teeth of the first main gear.

According to an embodiment, the center point of the first gear portion is disposed below a gear center point of the first main gear.

According to an embodiment, a first minimum distance between a rear surface of the display and the first compound gear in an unfolded state of the foldable electronic device may be larger than a second minimum distance between the rear surface of the display and the first compound gear in a folded state of the foldable electronic device.

According to an embodiment, the first compound gear may include a gear body having a first length in one axis larger than a second length in another axis perpendicular to the one axis.

According to an embodiment, the first gear portion and the second gear portion of the first compound gear may be disposed on the same plane.

According to an embodiment, the first gear portion may include a plurality of gear teeth disposed within an angle range that is smaller than 90 degrees.

According to an embodiment, the second gear portion may include a plurality of gear teeth disposed within an angle range that is smaller than 270 degrees.

According to an embodiment, in the unfolded state of the foldable electronic device, gear teeth disposed at one end of the first gear portion may be geared with the first main gear.

According to an embodiment, in the folded state of the foldable electronic device, gear teeth disposed at an end opposite to the one end of the first gear portion are geared with the first main gear.

According to an embodiment, the first gear portion and the second gear portion of the first compound gear may be disposed in a stack structure.

According to an embodiment, the gear teeth of the second gear portion may be disposed to be continuous in a circular structure.

According to an embodiment, the gear teeth of the second gear portion may be disposed to be continuous in an arch structure that is smaller than 270 degrees.

According to an embodiment, the foldable electronic device may further include at least one identification structure that is used to distinguish the first compound gear from the second compound gear.

According to an embodiment, the identification structure may include at least one recess, hole, or boss formed in at least one of the first compound gear or the second compound gear.

According to an embodiment, a hinge structure included in the foldable electronic device may include a first rotary shaft 231 rotating about a first axis 11, a second rotary shaft 232 rotating about a second axis 12, a first arm part 221 connected to the first rotary shaft, a second arm part 222 connected to the second rotary shaft, a first rotation part 211 connected to the first arm part and rotating about a third axis, a second rotation part 212 connected to the second arm part and rotating about a fourth axis, a first main gear 231_2 disposed on the first rotary shaft, a second main gear 232_2 disposed on the second rotary shaft, and a first compound gear and a second compound gear disposed between the first main gear and the second main gear, the first compound gear may include a first gear portion 233_1 geared with the first main gear, and of which a distance from a center point to a gear tooth end is a first radius, and a second gear portion 233_2 geared with the second compound gear, and of which a distance from a center point to a gear tooth end is a second radius that is smaller than the first radius, and the second compound gear may include a third gear portion 234_1 geared with the second main gear, and of which a distance from a center point to a gear tooth end is a first radius, and a fourth gear portion 234_2 geared with the second gear portion of the first compound gear, and of which a distance from a center point to a gear tooth end is the second radius.

According to an embodiment, a size of the gear teeth of the first gear portion may be the same as a size of the gear teeth of the second gear portion.

According to an embodiment, a size of the gear teeth of the first gear portion may be the same as a size of the gear teeth of the first main gear.

According to an embodiment, the center point of the first gear portion may be disposed below a gear center point of the first main gear.

Meanwhile, at least some components included in the embodiments described in FIGS. 1 to 18 may be replaced by similar components described in other embodiments or may be modified similarly to the components described in the other embodiments. Accordingly, at least a portion of a specific configuration described in one or more of the drawings may be applied to other drawings. For example, the cam structure described in FIGS. 17 and 18 may be applied as shown when the foldable electronic device described in FIGS. 1 to 16 employs a cam structure. At least some of the structures of the compound gears described in FIGS. 14 and 15 may replace at least some of the idle gears of the foldable electronic device described in the other drawings.

While the present disclosure has been shown and described with reference to various embodiments thereof, it will be understood by those skilled in the art that various changes in form and details may be made therein without departing from the present disclosure as defined by the appended claims and their equivalents.

The invention claimed is:

1. A foldable electronic device comprising:
    a first housing and a second housing;
    a hinge structure connected to the first housing and the second housing; and
    a display disposed in the first housing and the second housing,
    wherein the hinge structure includes:
        a first shaft rotating about a first axis;

a second shaft rotating about a second axis;
a first arm part connected to the first shaft;
a second arm part connected to the second shaft;
a first rotation part connected to the first arm part and rotating about a third axis;
a second rotation part connected to the second arm part and rotating about a fourth axis;
a first main gear disposed on the first shaft;
a second main gear disposed on the second shaft; and
a first compound gear and a second compound gear disposed between the first main gear and the second main gear,
wherein the first compound gear includes:
a first gear portion geared with the first main gear, and of which a distance from a center point of the first gear portion to a gear tooth end of the first gear portion is a first radius; and
a second gear portion geared with the second compound gear, and of which a distance from a center point of the second gear portion to a gear tooth end of the second gear portion is a second radius that is smaller than the first radius; and
wherein the second compound gear includes:
a third gear portion geared with the second main gear, and of which a distance from a center point of the third gear portion to a gear tooth end of the third gear portion is the first radius; and
a fourth gear portion geared with the second gear portion of the first compound gear, and of which a distance from a center point of the fourth gear portion to a gear tooth end of the fourth gear portion is the second radius.

2. The foldable electronic device of claim 1, wherein a size of gear teeth of the first gear portion is the same as a size of gear teeth of the second gear portion.

3. The foldable electronic device of claim 1, wherein a size of gear teeth of the first gear portion is the same as a size of gear teeth of the first main gear.

4. The foldable electronic device of claim 1, wherein the center point of the first gear portion is disposed below a gear center point of the first main gear with respect to a direction of the display.

5. The foldable electronic device of claim 1, wherein a first minimum distance between a rear surface of the display and the first compound gear in an unfolded state of the foldable electronic device is larger than a second minimum distance between the rear surface of the display and the first compound gear in a folded state of the foldable electronic device.

6. The foldable electronic device of claim 1, wherein the first compound gear further comprises:
a gear body having a first length in one axis larger than a second length in another axis perpendicular to the one axis.

7. The foldable electronic device of claim 1, wherein the first gear portion and the second gear portion of the first compound gear is disposed on the same plane.

8. The foldable electronic device of claim 1, wherein the first gear portion includes a plurality of gear teeth disposed within an angle range that is smaller than 90 degrees.

9. The foldable electronic device of claim 1, wherein the second gear portion includes a plurality of gear teeth disposed within an angle range that is smaller than 270 degrees.

10. The foldable electronic device of claim 1, wherein, in an unfolded state of the foldable electronic device, gear teeth disposed at one end of the first gear portion are geared with the first main gear.

11. The foldable electronic device of claim 10, wherein, in a folded state of the foldable electronic device, gear teeth disposed at an end opposite to the one end of the first gear portion are geared with the first main gear.

12. The foldable electronic device of claim 1, wherein the first gear portion and the second gear portion of the first compound gear is disposed in a stack structure.

13. The foldable electronic device of claim 12, wherein gear teeth of the second gear portion are disposed to be continuous in a circular structure, and
wherein the gear teeth are disposed to be continuous in an arc structure that is smaller than 270 degrees.

14. The foldable electronic device of claim 1, further comprising:
at least one identification structure configured to be used to distinguish the first compound gear from the second compound gear.

15. The foldable electronic device of claim 14, wherein the identification structure includes at least one recess, hole, or boss formed in at least one of the first compound gear or the second compound gear.

* * * * *